United States Patent
Yasuda

(10) Patent No.: US 9,733,977 B2
(45) Date of Patent: Aug. 15, 2017

(54) DISTRIBUTED PROCESSING SYSTEM, DISTRIBUTED PROCESSING DEVICE, DISTRIBUTED PROCESSING METHOD, AND DISTRIBUTED PROCESSING PROGRAM

(71) Applicant: NEC CORPORATION, Tokyo (JP)

(72) Inventor: Junichi Yasuda, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 14/785,796

(22) PCT Filed: May 29, 2014

(86) PCT No.: PCT/JP2014/064257
§ 371 (c)(1),
(2) Date: Oct. 20, 2015

(87) PCT Pub. No.: WO2014/192867
PCT Pub. Date: Dec. 4, 2014

(65) Prior Publication Data
US 2016/0070591 A1 Mar. 10, 2016

(30) Foreign Application Priority Data
May 31, 2013 (JP) .................................. 2013-115527

(51) Int. Cl.
*G06F 9/46* (2006.01)
*G06F 9/48* (2006.01)
(Continued)

(52) U.S. Cl.
CPC ................ *G06F 9/48* (2013.01); *G06F 9/445* (2013.01); *G06F 9/44521* (2013.01); *G06F 17/3007* (2013.01); *G06F 2209/549* (2013.01)

(58) Field of Classification Search
None
See application file for complete search history.

(56) References Cited

U.S. PATENT DOCUMENTS 7,503,047 B1  3/2009  Richter
2010/0042998 A1*  2/2010  Abdelnur .............. G06F 9/4843
                                                        718/101
(Continued)

FOREIGN PATENT DOCUMENTS

JP       11-53321 A     2/1999
JP     2003-505750 A    2/2003
(Continued)

OTHER PUBLICATIONS

International Search Report of PCT/JP2014/064257, dated Aug. 26, 2014. [PCT/ISA/210].
(Continued)

*Primary Examiner* — Sisley Kim
(74) *Attorney, Agent, or Firm* — Sughrue Mion, PLLC

(57) ABSTRACT

A distributed processing system in which a plurality of computers are interconnected, wherein each of the computers is provided with a module loader which loads each module and performs initialization processing, a metadata management unit which acquires metadata including a command for the initialization processing from a previously provided storage means or another computer, a file management unit which reads and writes a file within the storage means or the other computer, and an execution container which executes a distributed batch application. The file management unit examines whether or not an execution region including an execution code of a corresponding module is present in the storage means after the initialization processing, and when the execution region is not present, loads the execution code from the other computer and writes the loaded execution code as the execution region.

12 Claims, 22 Drawing Sheets

(51) Int. Cl.
   *G06F 9/445*   (2006.01)
   *G06F 17/30*  (2006.01)

(56) References Cited

U.S. PATENT DOCUMENTS

| | | |
|---|---|---|
| 2012/0151201 A1 | 6/2012 | Clerc et al. |
| 2014/0089611 A1* | 3/2014 | Matsubara ............. G06F 12/00 |
| | | 711/154 |

FOREIGN PATENT DOCUMENTS

| | | |
|---|---|---|
| JP | 2004-533687 A | 11/2004 |
| JP | 2004-342042 A | 12/2004 |
| JP | 2006-155187 A | 6/2006 |
| JP | 2008-171277 A | 7/2008 |
| JP | 2011-34137 A | 2/2011 |
| JP | 2012-63832 A | 3/2012 |
| JP | 2012-128841 A | 7/2012 |

OTHER PUBLICATIONS

Takeshi Wakimoto, "Let's Try Distributed Processing", Sep. 29, 2010, (searched on May 14, 2013), Pasona TECH, <URL: http://www.pasonatech.co.jp/techlab/rdtrend/rep7.jsp>.

* cited by examiner

FIG. 7

```
step1.class
 [METADATA]
  <clinit>
  <init>
  METHOD1
  METHOD2
  (DEPENDENT RELATION)
   NO
```

115

DISTRIBUTED PROCESSING SYSTEM, DISTRIBUTED PROCESSING DEVICE, DISTRIBUTED PROCESSING METHOD, AND DISTRIBUTED PROCESSING PROGRAM

CROSS REFERENCE TO RELATED APPLICATIONS

This application is a National Stage of International Application No. PCT/JP2014/064257 filed May 29, 2014, claiming priority based on Japanese Patent Application No. 2013-115527, filed May 31, 2013, the contents of all of which are incorporated herein by reference in their entirety.

TECHNICAL FIELD

The present invention relates to a distributed processing system, a distributed processing device, a distributed processing method, and a distributed processing program. More specifically, the present invention relates to a distributed processing system and the like capable of executing processing at a high speed by reducing the communication volume.

BACKGROUND ART

The processing that is required to be achieved by computers has become more and more sophisticated and large-scaled. However, improvement in the performances (calculation capacity, storage volume, and the like) as hardware alone has already reached the limit. Therefore, recently, techniques of distributed processing (distributed database, distributed cache, distributed shared memory, distributed batch, and the like) with which a plurality of computers being connected mutually via a network cooperate and execute the processing in an allotted manner have especially been developed.

Recently in particular, it has become possible to acquire a RAM (main storage unit) with a capacity of 4 GB level, a hard disk (external memory device) with a capacity of 1 TB level, an NIC (network card) with a communication speed of 1 Gbps level, and the like at a low price in the field of personal computers and to connect computer devices provided with those mutually via a high-speed network easily. Therefore, it has become common to connect a plurality of such nodes (server devices) and to employ distributed processing middleware for each node to have it execute distributed processing.

The middleware is software which is typically provided between an operating system (OS) and application software and executes expansion of OS functions and multi-purpose functions of the application software. Among those, the distributed processing middleware provides functions required in the distributed processing (data synchronization among a plurality of nodes, distribution/disposition of application, start/end of process, error processing, etc.). Recently in particular, the so-called cloud computing which performs processing by a large number of nodes in a cooperated manner has become developed, so that the importance of the distributed processing middleware is especially becoming increased.

As the distributed processing methods that can be executed by a distributed processing system using the distributed processing middleware, there are a plurality of methods such as MapReduce, BSP, and MPI. Among those, a master-slave type distributed processing method is also a typical method.

The master-slave type is a kind of processing modes, with which a control component or a node called a master controls other nodes, devices, and processes called slaves. When a master-slave relation is established between nodes or between processes, control of the slave is always done by the master.

FIG. 20 is an explanatory chart showing the structure of an existing distributed processing system 900. The distributed processing system 900 is constituted by mutually connecting a plurality of computer devices via a network 930. One of the computer devices is a master node 910, and the others are slave nodes 920a, 920b, - - - (referred to as slave node 920 as a general term).

Distributed processing middleware 912 is installed on an OS 911 (operating system) of the master node 910. Similarly, distributed processing middleware 922 is installed on an OS 921 of the slave node 920.

The master node 910 distributes a distributed application to the slave node 920 to have it execute necessary processing. However, the part processed by the slave node is not completely the same as that of the master node but may often be a part of the processing or a part of the data. Through executing different processing or processing different data in each of the nodes, a plurality of kinds of processing can be distributed and parallelized. Therefore, the processing can be executed at a high speed.

FIG. 21 is an explanatory chart showing the structure of a distributed application 950 that is executed by the distributed processing system 900 shown in FIG. 20. The distributed application 950 is constituted by combining a plurality of sets of processing modules, common modules, setting files, binary data (image file and the like), etc.

Each of the modules is an execution format file, a common library file, or the like. In a case of Windows (registered trademark), for example, it is an EXE file, a DLL file, or the like. In a case of Linux (registered trademark), it is a shell script, an execution file, a library file, or the like. In a case of Java (registered trademark), it is a Jar file, a Class file, or the like.

In any cases, each of the modules is constituted with "metadata" and "execution region". The metadata is data regarding the module such as the module name, signature (a set of method name and argument), field, constant, and the like. The execution region is an execution code such as the method which is actually operated.

Further, each module includes initialization processing at the time of execution. More specifically, DLL initialization of Windows is DllMain( ), library initialization of Linux is _init( ), and initialization of Java is <clinit>, <init>, for example.

When the distributed application 950 starts up, metadata of the processing module started first in each node is loaded to analyze the metadata, and the constants and execution regions are disposed in a memory to be able to actually execute the processing. If a dependent relation for another module is included therein, actions of loading that module and solving the dependent relation to be in a state where call between the modules can be done (called "link") are repeated.

Normally, each module has a part for the initialization processing. Through executing the initialization processing after being linked, the concerned application comes to be in an executable state. That is, through repeating actions of "reading out necessary file (Load)→solving dependent relation of each of the modules (Link)→execute initialization processing (Initialize)", the distributed application 950 becomes executable.

However, the loading timing of each of the modules depends on the implementation of each device, and there are a case where the necessary modules are all loaded at the time of startup and a case where the modules are not loaded until those are actually referred.

As the related technical documents thereof, there are following documents. Depicted in Patent Document 2 is a distributed processing system which selects object data based on a set rule and improves the efficiency of the processing that uses it. Depicted in Patent Document 2 is a technique which performs management of distributed processing by using graphic user interface. Depicted in Patent Document 3 is a technique regarding disposition of metadata on a network.

Depicted in Patent Document 4 is a distributed processing system which uses a processing device that is provided with a sub-processor specialized in specific processing. Depicted in Patent Document 5 is deployment of web services on a network. Depicted in Patent Document 6 is a technique which acquires information required in a distributed processing device from other devices if the necessary information is not provided in the own device to share the information among all the devices.

Depicted in Patent Document 7 is a technique regarding layout of metadata of multilayer software. Depicted in Non-Patent Document 1 is the outline of Hadoop that is typical distributed processing middleware.

Patent Document 1: Japanese Unexamined Patent Publication 2012-063832
Patent Document 2: Japanese Unexamined Patent Publication 2011-034137
Patent Document 3: Japanese Unexamined Patent Publication 2008-171277
Patent Document 4: Japanese Unexamined Patent Publication 2006-155187
Patent Document 5: Japanese Unexamined Patent Publication 2004-533687
Patent Document 6: Japanese Unexamined Patent Publication 2004-342042
Patent Document 7: Japanese Unexamined Patent Publication 2003-505750
Non-Patent Document 1: "Let's Try Distributed Processing" Takeshi Wakimoto. Sep. 29, 2010, (searched on May 14, 2013), Pasona TECH, <URL: http://www.pasonatech.co.jp/techlab/rdtrend/rep7.jsp>

In the current Description, the distributed processing system 900 which operates in a Java environment such as Hadoop depicted in Non-Patent Document 1 described above is assumed, so that it is to be noted that each of processing modules and common modules are written as class (.class) files. Note, however, that the present invention is not necessarily limited to the Java environments.

The distributed application 950 shown in FIG. 21 includes processing modules 951 to 953 (step01.class to step03.class) of the first to third steps, first to third common modules 954 to 956 (shared01.class to shared03.class) used in each of the steps, other setting files, binary data, and the like.

Further, the distributed application 950 also includes a processing module 952a (step02_slave.class) on the slave node side of the second step since the master node 910 and each of the slave nodes 920 executes the second step by performing distributed processing in a cooperative manner while the first and the third steps are executed by the master node 910 alone. Each of the above-described files is put into one file under a file name such as "distributed batch application 1.jar) or the like.

FIG. 22 is an explanatory chart showing actions of a case where the distributed application 950 shown in FIG. 21 is executed by the existing distributed processing system 900 shown in FIG. 20. The master node 910 upon receiving an execution command from a user distributes the file (distributed batch application 1.jar) of the distributed application 950 to each of the slave nodes 920. In each of the nodes, each of the distributed processing middleware 912 (922) starts up a process, expands the file of the distributed application 950, loads the class file, and executes it.

However, as shown in FIG. 21, not all of the steps of the distributed application 950 execute the distributed processing. Thus, if simply the file (distributed batch application 1.jar) of the distributed application 950 is distributed to each node, the file that is not used in the distributed processing is also transferred. This is clearly useless transfer. Especially, when a file of large size such as images, moving pictures, audios, or the like is contained, it is wasted unless such file is used.

Further, when the file is transferred at the time of execution, an issue of delay in the startup processing of the slave node 920 occurs. Referring to a case shown in FIG. 21, distributed processing is performed in the second step. When the master node 910 distributes the file of the distributed application 950 to each of the slave nodes 920 at a point where the first step is completed and the second step is started, delay is generated in the distribution processing and in the processing executed at a stage of expanding the "distributed batch application 1.jar" file and loading the class file.

In order for not causing the delay, there is considered a method with which the file of the distributed application 950 is distributed and expansion and loading of the class file are to be completed on each of the slave nodes 920 side while the master node 910 alone is executing the first step. However, this may cause another issue.

In the distributed processing, the number of the slave nodes 920 may often become several thousands, several tens of thousands, or may be in a scale that is greater than those. Further, the distributed processing middleware 912 (922) normally allots the processing to the set number of slave nodes after checking the condition of the resources (calculator resources) of each node at a point where the distribution processing is to be executed actually. That is, it is not possible to know which of the slave nodes executes the distributed processing until that point.

Therefore, if the file of the distributed application 950 is distributed unconditionally to each of the slave nodes 920 in advance, the file may be distributed in advance even to the slave node 920 to which the processing is actually not allotted. This is also useless transfer. That is, to distribute the file of the distributed application 950 in advance for not causing delay in the startup processing of the slave nodes 920 is not considered appropriate.

Further, the distributed processing executed by each of the nodes (the master node 910 and each of the slave nodes 920) in a cooperative manner in many cases is executed to perform same processing on different target data, so that the startup processing executed at the time of startup in each node is often the common processing.

Regardless of that, the distributed processing middleware 922 of each of the slave nodes 920 normally generates and deletes the process by each of the operation steps. Thus, each of the nodes executes the same startup processing every time for each of the operation steps. This is also useless processing that may be a reason for causing delay.

A technique capable of overcoming the above-described issues and achieving both reducing the data volume to be transferred to each of the slave nodes at the time of execution and starting the distributed processing at a high speed is not depicted in Patent Documents 1 to 7 and Non-Patent Document 1 described above.

It is therefore an object of the present invention to provide a distributed processing system, a distributed processing device, a distributed processing method, and a distributed processing program capable of reducing the data volume to be transferred to each of the slave nodes at the time of execution and starting the distributed processing at a high speed.

DISCLOSURE OF THE INVENTION

In order to achieve foregoing object, the distributed processing system according to the present invention is a distributed processing system which includes a plurality of mutually connected computers which execute a distributed batch application in a cooperative and distributed manner, wherein: each of the computers includes a module loader which performs initialization processing by loading each module constituting the distributed batch application, a metadata management unit which acquires metadata containing a command of the initialization processing among each of the modules from a storage module provided in advance or from another computer, a file management unit which reads/writes a file in the storage module or in another computer, and an execution container which executes the distributed batch application; and the file management unit includes a function which checks whether or not an execution region containing an execution code of the module exists in the storage module after the module loader performs the initialization processing by the metadata and, when the execution region does not exist, loads the execution code from another computer and writes it as the execution region.

In order to achieve the foregoing object, the distributed processing device according to the present invention is a distributed processing device, a plurality of which being connected mutually to constitute a distributed processing system which executes a distributed batch application in a cooperative and distributed manner, and the distributed processing device includes: a module loader which performs initialization processing by loading each module constituting the distributed batch application; a metadata management unit which acquires metadata containing a command of the initialization processing among each of the modules from a storage module provided in advance or from another computer; a file management unit which reads/writes a file in the storage module or in another computer; and an execution container which executes the distributed batch application, wherein the file management unit includes a function which checks whether or not an execution region containing an execution code of the module exists in the storage module after the module loader performs the initialization processing by the metadata and, when the execution region does not exist, loads the execution code from another computer and writes it as the execution region.

In order to achieve the foregoing object, the distributed processing method according to the present invention is a distributed processing method used in a distributed processing system which includes a plurality of mutually connected computers which execute a distributed batch application in a cooperative and distributed manner, wherein: a metadata management unit acquires metadata containing a command of initialization processing among each module which constitutes the distributed batch application; a module loader performs the initialization processing by the metadata; after the initialization processing, a file management unit checks whether or not an execution region containing an execution code of the module exists in the storage module; when the execution region containing the execution code does not exist, the file management unit loads the execution code from another computer and writes it as the execution region; and an execution container executes the module containing the execution code.

In order to achieve the foregoing object, the distributed processing program according to the present invention is a distributed processing program used in a distributed processing system which includes a plurality of mutually connected computers which execute a distributed batch application in a cooperative and distributed manner, and the program causes the computers to execute: a procedure for acquiring metadata containing a command of initialization processing among each module which constitutes the distributed batch application; a procedure for performing the initialization processing by the metadata; a procedure for checking whether or not an execution region containing an execution code of the module exists in the storage module after the initialization processing; a procedure for loading the execution code from another computer and writing it as the execution region when the execution region does not exist in the storage module; and a procedure for executing the module containing the execution code.

The present invention is structured to execute tentative initialization processing only by the metadata as described above and to load the execution code from other computers thereafter if there is no execution code. Therefore, the execution code is not transmitted to the computer that does not execute the processing. This makes it possible to provide the distributed processing system, the distributed processing device, the distributed processing method, and the distributed processing program exhibiting such excellent feature that it is capable of reducing the data volume to be transferred to each of the slave nodes at the time of execution and starting the distributed processing at a high speed.

BRIEF DESCRIPTION OF THE DRAWINGS

FIG. 7 is an explanatory chart showing a metadata sharing unit in a state where processing of up to step S106 in FIG. 5 is completed;

BEST MODES FOR CARRYING OUT THE INVENTION (Basic Mode)

Figure 1:
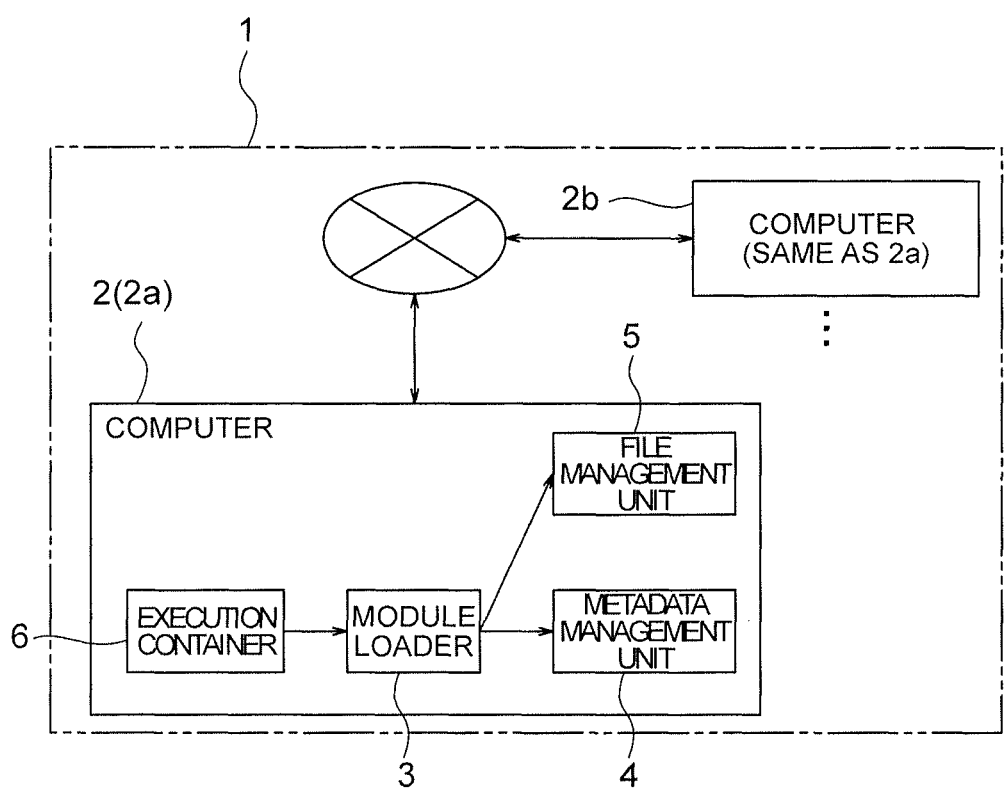
FIG. 1 is an explanatory chart showing the structure of a distributed processing system according to a basic mode of the present invention.

Hereinafter, the structures of the basic mode of the present invention will be described by referring to the accompanying drawing FIG. 1.

A distributed processing system 1 according to the basic mode is a distributed processing system in which a plurality of computers 2a, 2b, - - - are connected mutually and those computers execute a distributed batch application in a cooperative and distributed manner. Each of the computers 2 includes: a module loader 3 which loads each module that constitutes the distributed batch application and performs initialization processing; a metadata management unit 4 which acquires metadata containing a command of the initialization processing among each module from a storage module provided in advance or from other computers; a file management unit 5 which reads/writes files in the storage module or other computers; and an execution container 6 which executes the distributed batch application. Further, the file management unit 114 is provided with a function which checks whether or not the execution region containing the execution code of the module exists in the storage module after the module loader executes the initialization processing by the metadata and loads the execution code from another computer and writes it as an execution region if it is found that the execution code does not exist.

More detailed structures of each unit and each device will be described as a first embodiment in the followings.

First Embodiment

Subsequently, the structures of the first embodiment of the present invention will be described by referring to the accompanying drawings FIGS. 2 to 3.

A distributed processing system 100 according to the embodiment is a distributed processing system in which a plurality of computers (a master node 10 and slave nodes 20) are connected mutually and those computers execute distributed batch application 120 in a distributed and cooperative manner. Each of the computers 2 includes: a module loader 112 which loads each module that constitutes the distributed batch application and performs initialization processing; a metadata management unit 113 which acquires metadata containing a command of the initialization processing among each module from the storage module provided in advance or from other computers; a file management unit 114 which reads/writes files in the storage module or other computers; and an execution container 111 which executes the distributed batch application. Further, the file management unit 114 is provided with a function which checks whether or not the execution region containing the execution code of the module exists in the storage module after the module loader executes the initialization processing by the metadata and loads the execution code from another computer and writes it as an execution region if it is found that the execution code does not exist.

Further, the file management unit 114 has a function which creates the module of only the metadata as a file and shares it with the other computers by the metadata management unit 113.

Further, one of the plurality of computers is the master node 10 which manages distributed execution of the distributed batch application, and the computers other than the master node are the slave nodes 20. Note here that the file management unit 114 of the master node 10 has a function which creates the module of only the metadata as a file and transmits it to the slave nodes 20.

With the above-described structures, the distributed processing system becomes capable of reducing the data volume to be transferred to each of the slave nodes at the time of execution and starting the distributed processing at a high speed.

This will be described in more details hereinafter.

Figure 2:
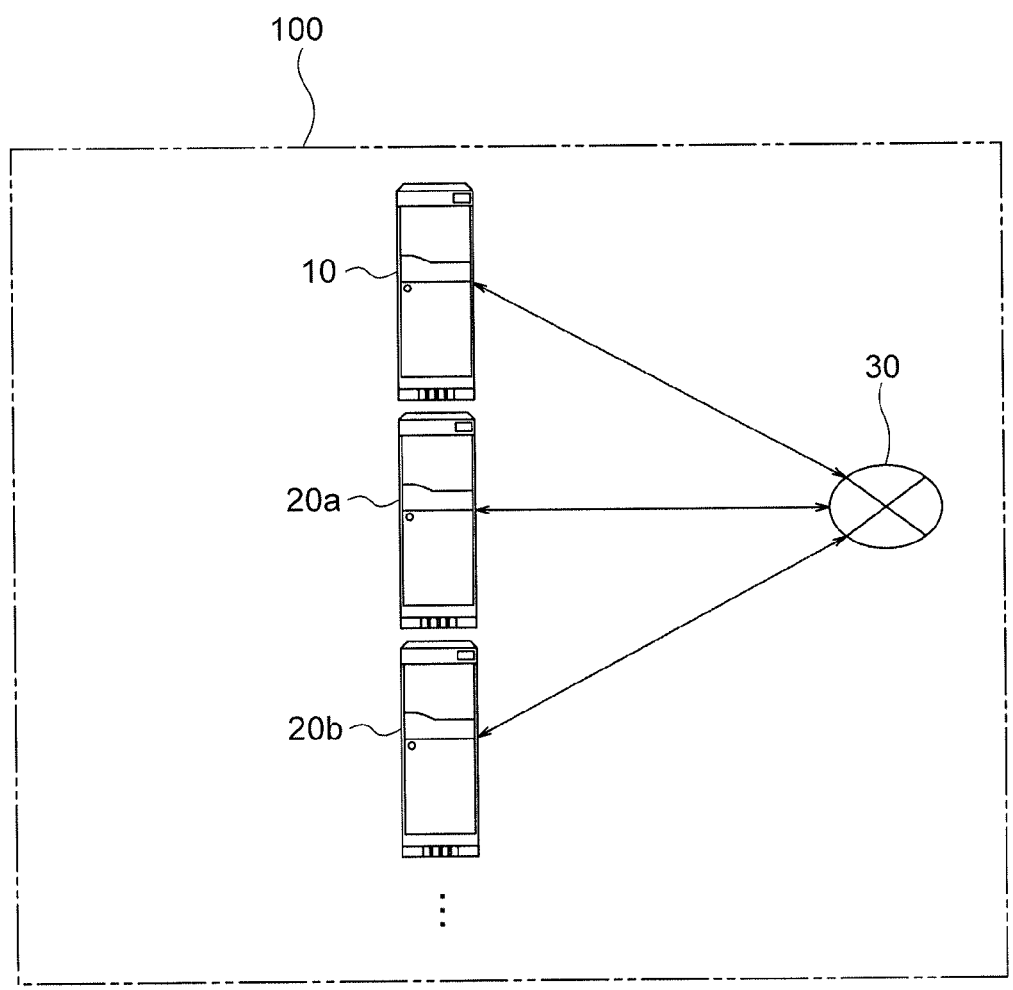
FIG. 2 is an explanatory chart showing the structures of a distributed processing system according to a first embodiment of the present invention.

FIG. 2 is an explanatory chart showing the structure of the distributed processing system 100 according to the first embodiment of the present invention. The distributed processing system 100 is structured by mutually connecting a plurality of computer devices via a network 30, and there is no specific limit set in the number of the computers. In FIG. 2, only three nodes that are the master node 10 (distributed processing device) and the slave nodes 20a, 20b (distributed processing devices) are illustrated for presenting the concept of the present invention in a simple manner. The slave nodes 20*a* and 20*b* are referred to as the slave nodes 20 as a general term.

Figure 3:
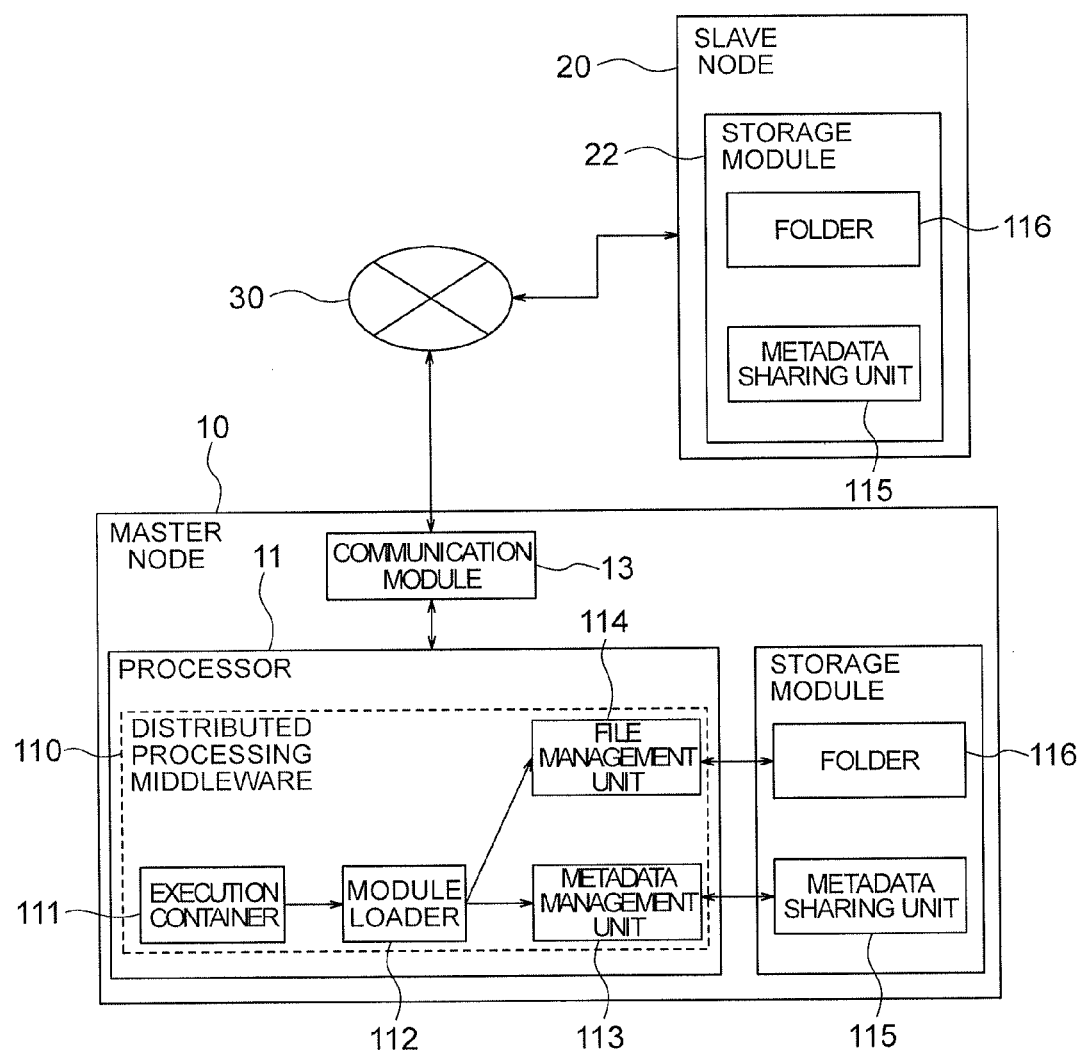
FIG. 3 is an explanatory chart showing more detailed structures of a master node and a slave node shown in FIG. 2.

FIG. 3 is an explanatory chart showing the more detailed structures of the master node 10 and the slave node 20 shown in FIG. 2. While FIG. 3 shows the structure regarding the master node 10, the slave node 20 also has the same structure in terms of hardware.

The master node 10 includes: a processor 11 that is the main unit for executing computer programs; the storage module 12 which stores the programs and data; and a communication module 13 which performs data communications with the other devices by being connected to the network 30. The master node 10 also is provided with many hardware elements other than those. However, only the elements that are required to be explained to describe the present invention will be discussed herein. Further, the slave node 20 also includes a processor 21, a storage module 22, and a communication module 23 same as those of the master node 10.

In the processor 11, an OS 101 (operating system) first operates and, on condition of that, the distributed processing middleware 110 operates thereafter. The distributed processing middleware 110 includes each of functional units such as an execution container 111, a module loader 112, a metadata management unit 113, and a file management unit 114, and uses the storage module 22 to function as a metadata sharing unit 115 and a folder 116. Further, on condition of the actions of the distributed processing middleware 110, the distributed batch application 120 operates.

In the slave node 20, the same distributed processing middleware 110 as that of the master node 10 operates. However, only the metadata sharing unit 115, the folder 116, and the storage module 22 are illustrated on the slave node 20 side. Note, however, that acquisition of the metadata and reading/writing of the file from other nodes by the metadata management unit 113 and the file management unit 114 to be described later can be done by executing the same actions to the master node 10 from the slave node 20 side. Further, the same actions can be done mutually between the slave nodes 20*a* and 20*b* as well.

The execution container 111 executes the distributed batch application 120. The execution container 111 also can load the module of the distributed batch application 120 and read/write the file by using the module loader 112.

The module loader 112 loads the modules, setting files, and the like, analyzes the metadata, and dispose those on the folder 116 to be executable. This corresponds to class loader (ClassLoader) in Java language. "ClassLoader" is expanded herein, so that rearrangement of timing at which the metadata is loaded to the folder 116 and of initialization processing or re-initialization can also be done automatically.

The metadata management unit 113 performs management of the metadata of the module. The metadata management unit 113 acquires the metadata of the module from the metadata sharing unit 115 or the file management unit 114 and provides it to the module loader 112. Further, the metadata management unit can also acquire the metadata from the metadata sharing units 115 of other nodes.

The metadata sharing unit 115 provides a function which saves the loaded metadata of the module and shares it. Further, the metadata sharing unit 115 provides a function which allows the saved metadata to be referred from other nodes as well.

The file management unit 114 manages the files on the folders 116 of the own node or the other nodes and performs reading/writing. Further, also provided is a function which creates the file of only the metadata from the actual module file and reads/writes only the difference of the files of the other nodes. The folder 116 is a memory region that is managed by the file management unit 114.

Figure 4:
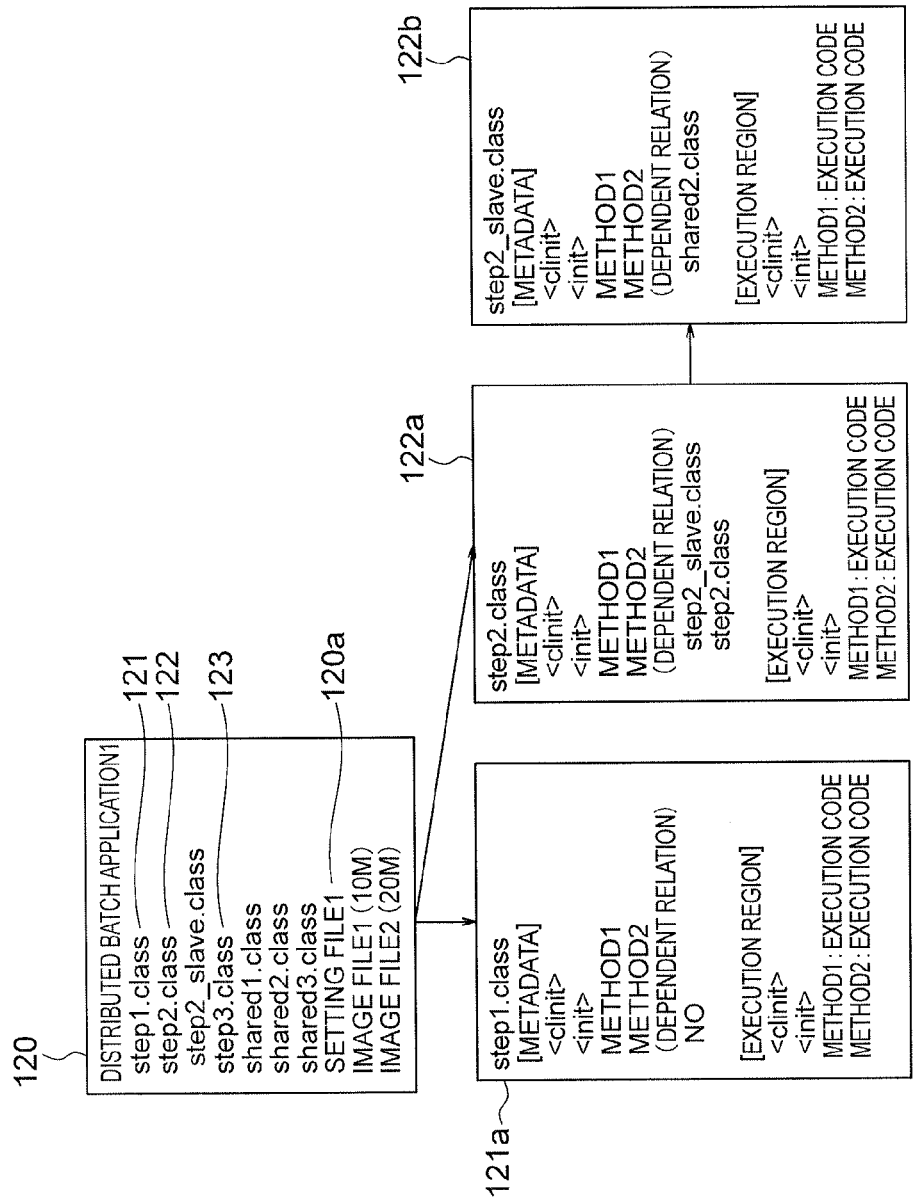
FIG. 4 is an explanatory chart showing the structure of distributed batch application that is an execution target of the distributed processing system shown in FIGS. 2 to 3.

FIG. 4 is an explanatory chart showing the structure of the distributed batch application 120 that is an execution target of the distributed processing system 100 shown in FIGS. 2 to 3. The distributed batch application 120 is constituted with a plurality of modules, setting files, binary files, and the like. Each module is constituted with metadata and an execution region. The metadata is a region where the dependent relation between each of the modules, initialization commands, and the like are stored. The execution region is a region where the codes to be actually executed are stored.

The distributed batch application 120 is constituted with first to third steps 121 to 123. In FIG. 4, shown are the distributed batch application 120 and the metadata as well as the execution regions of the first and second steps 121 and 122.

Among each of the steps, the first and third steps 121 and 123 are executed only by the master node 10. However, the second step 122 is done by distributed processing among each of the slave nodes 20 in a cooperative manner. Hereinafter, the execution container 111 of the master node 10 is referred to as a "master container", and the execution container 111 of the slave node 20 is referred to as a "slave container".

Further, the module executed by the master node 10 in the first step 121 is referred to as a first master module 121*a* (step1.class), the module executed by the master node 10 in the second step 122 is referred to as a second master module 122*a* (step2.class), and the module executed by the slave node 20 in the second step 122 is referred to as a slave module 122*b* (step2_slave.class).

Furthermore, a shared module 122*c* (shared2.class) is required for executing the second master module 122*a* and the slave module 122*b*.

The execution container 111 (master container) expands the distributed batch application 120 provided to the master node 10 on the folder 116, and each of the module file and setting file are saved on the expanded folder.

Further, the execution container 111 (master container) loads the metadata (to be described later) of the module file and solves (link) the dependent relation to perform initialization in order to start up the distributed batch application 120. The metadata sharing unit 115 of the metadata management unit 113 saves metadata loaded herein in the folder 116 via the module loader 112 and, at the same time gives it to the metadata sharing unit 115 of the slave node 20 to have it saved.

First, the first step 121 is executed only by the execution container 111 (master container) of the master node 10. In the following second step 122, the execution container 111 (master container) gives a command to perform slave execution of the second step 122 to the slave nodes 20. The slave nodes 20 start up the execution container 111 (slave container) to prepare for starting up the distributed batch application 120.

The slave node 20 acquires the metadata required for executing the second step 122 from the metadata sharing unit 115 of the master node 10. Then, the slave node creates a class file of only the metadata and stores it to the folder 116. The execution container 111 (slave container) of the slave node 20 calls a method for executing the processing of the slave module 122*b* (step2_slave.class). Note, however, that there is no actual execution code in the method to be called, and the method only gives a command for loading the execution region. Thus, that command is executed.

That is, the execution container 111 (slave container) of the slave node 20 acquires the data of the execution region of the slave module 122b (step2_slave.class) from the metadata sharing unit 115 of the master node 10, re-initializes the data of the storage region of the folder 116 according to the content written therein, and writes the slave module 122b (step2_slave.class) thereto. That is, in the slave node 20, re-initialization of both the metadata and the execution region is performed. Thereby, acquired is a state where normal application actions can be executed. Thus, the slave module 122b (step2_slave.class) is executed. The processing described above is executed simultaneously in the slave nodes 20a and 20b.

In the slave nodes 20a and 20b, acquisition and loading of the metadata can be done by using the data that is already executed by the master node 10. Thereby, it becomes possible to perform startup at a high speed. Further, the code and data required for execution are acquired after the code to be actually executed is called, so that the volume of the data to be actually transferred can be reduced.

Figure 5:
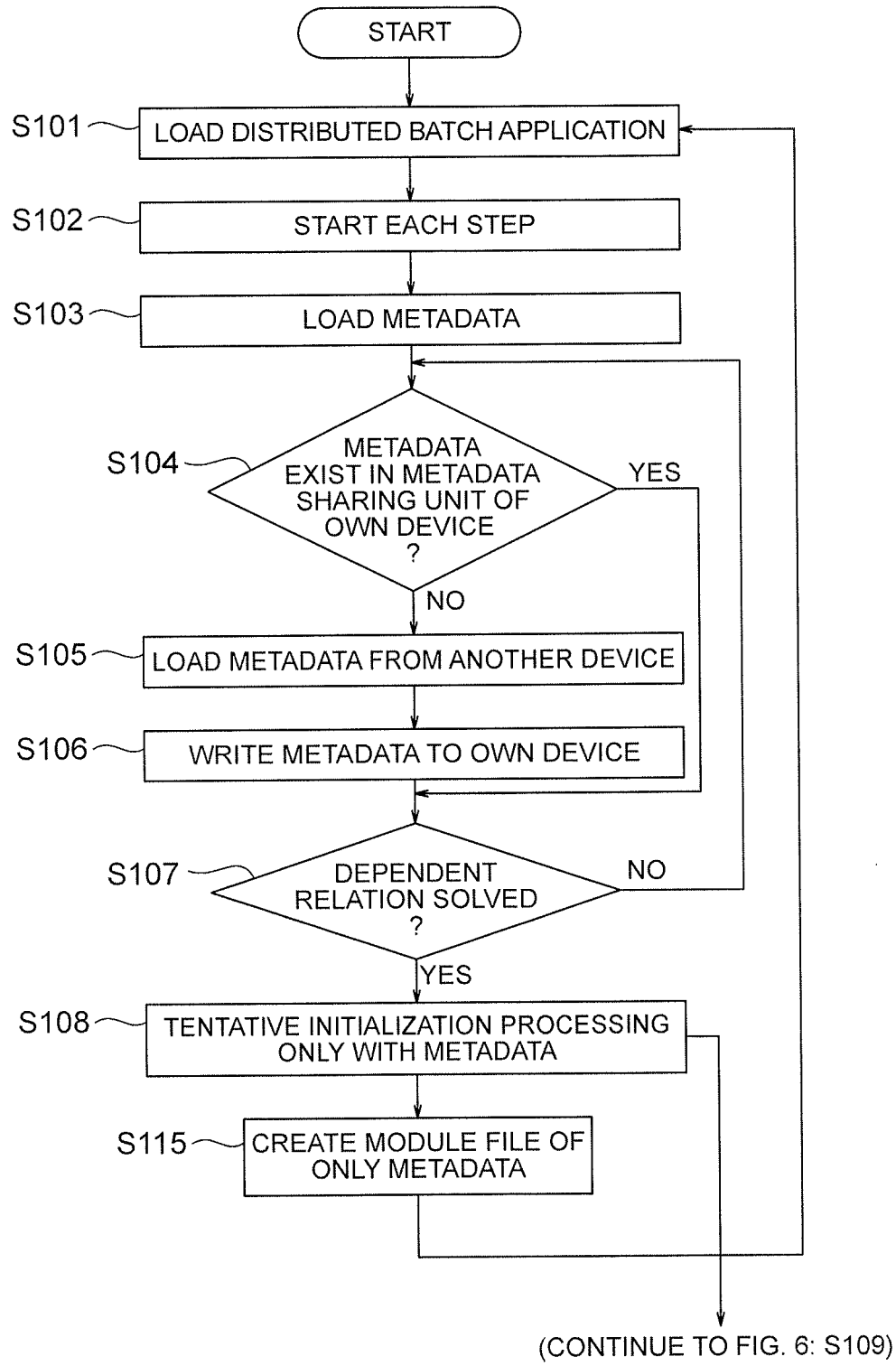
FIG. 5 is a flowchart showing the processing executed in a case where the distributed batch application shown in FIG. 4 is operated in the distributed processing system shown in FIGS. 2 to 3.
Figure 6:
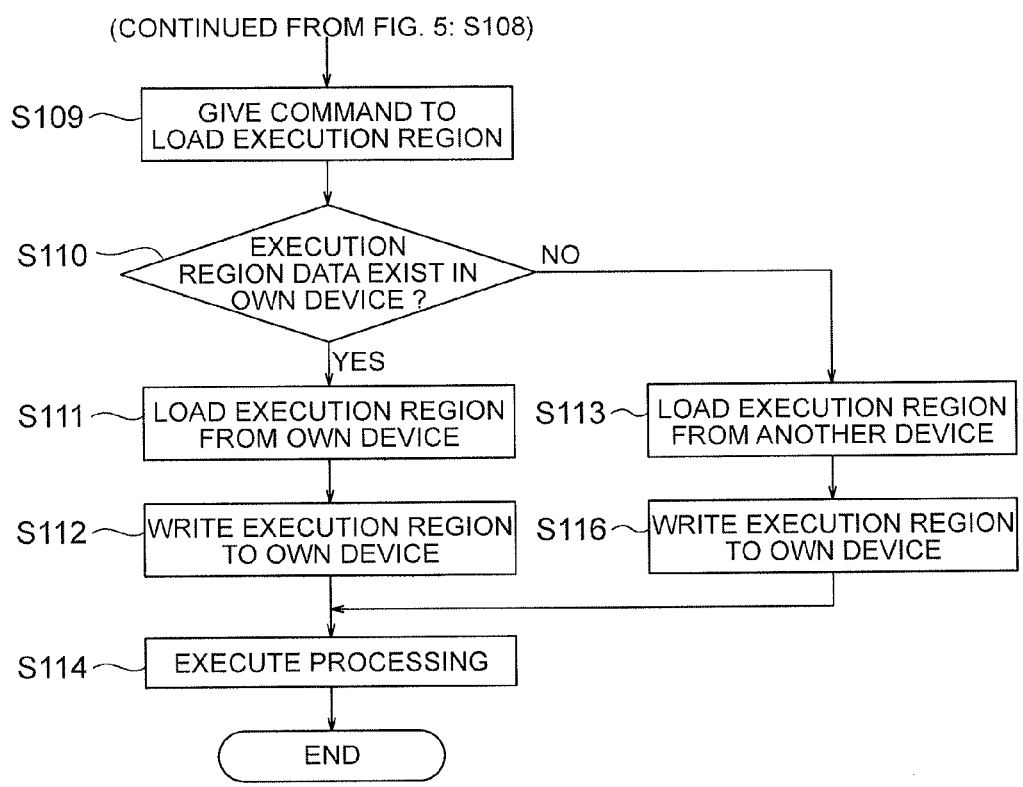
FIG. 6 is a flowchart continued from FIG. 5.

FIGS. 5 to 6 are flowcharts showing the processing executed in a case where the distributed batch application 120 shown in FIG. 4 is operated in the distributed processing system 100 shown in FIGS. 2 to 3. FIGS. 5 to 6 are shown dividedly in two pages because of the spaces of the paper face. First, the execution container 111 (master container) loads a distributed batch application 1.jar file, and saves each of the modules, setting files, and the like inside thereof to the folder 116 (step S101).

Subsequently, the execution container 111 (master container) loads a setting file 120a of the distributed batch application 120 and starts up the distributed batch application 120 (step S102). Herein, as shown in FIG. 1, the execution container 111 (master container) performs execution in order from the first step 121.

For executing the first step 121, the execution container 111 (master container) gives a command to the module loader 112 to load the first master module 121a (step1.class) to be in an executable state and, in response to that, the module loader 112 loads the metadata of the first master module 121a (step1.class) (step S103).

At that time, the module loader 112 makes an inquiry to the metadata management unit 113 regarding existence of the first master module 121a (step1.class). In response to that, the metadata management unit 113 checks whether or not there is metadata in the metadata sharing unit 115 of the master node 10. The metadata does not exist in the metadata sharing unit 115 at this point, so that the metadata management unit 113 returns a response indicating "no" to the module loader 112 (step S104).

The module loader 112 upon receiving it gives a command to the file management unit 114 to load the metadata of the first master module 121a (step1.class) from the file on the folder 116. The file management unit 114 searches the first master module 121a (step1.class) from the folder 116, loads the metadata, and gives it to the module loader 112 (step S105).

Subsequently, the module loader 112 expands the metadata of the first master module 121a (step1.class) on the memory and informs it to the metadata management unit 113 at the same time. The metadata management unit 113 writes the metadata to the metadata sharing unit 115 (step S106). FIG. 7 is an explanatory chart showing the state of the metadata sharing unit 115 in a state where the processing up to step S106 shown in FIG. 5 is completed.

Subsequently, the module loader 112 loads the metadata of the first master module 121a (step1.class) and when the required shared modules and slave modules are defined in the section of the "dependent relation" of the metadata, loads the necessary file according to the definition or gives a command to other devices (step S107). In the case of the embodiment, the dependent relation is not specifically defined in the first master module 121a. Thus, nothing special is executed herein, and it is advanced to "dependent relation is solved" side.

Figure 8:
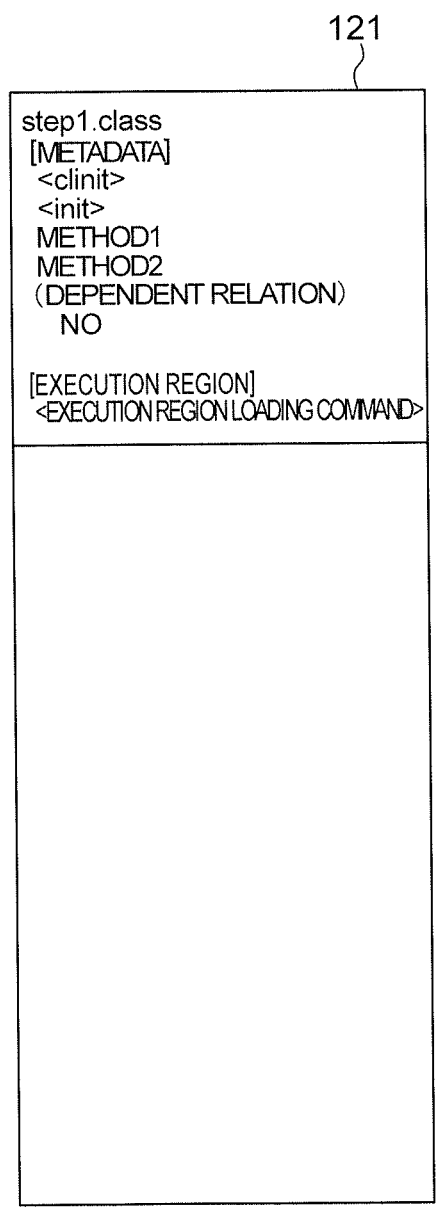
FIG. 8 is an explanatory chart showing a first master module (step1.class) in which "execution region loading command" is defined by distributed batch application shown in FIG. 4.

Then, the module loader 112 performs tentative initialization processing (step S108). In practice, the normal initialization processing of the first master module 121a (step1.class) is not executed, and the first master module 121a (step1.class) is defined in advance to call "<clinit>" and all the other methods to call "execution region loading command". FIG. 8 is an explanatory chart showing the first master module 121a (step1.class) whose "execution region loading command" is defined in the distributed batch application 120 shown in FIG. 4.

The "execution region loading command" herein is the method which performs re-initialization by loading the execution region of the class designated in the module loader 112 to be in a state capable of executing the application. Tentative initialization is performed in this manner, and it is considered that the normal initialization processing ended thereby. The first step 121 does not include distributed processing, so that step S115 to be described later is not executed herein.

Thereby, the execution container 111 (master container) starts to execute the first master module 121a (step1.class). As shown in FIG. 8, in the embodiment, the actual execution code is replaced with "execution region loading command". Thus, the execution container 111 (master container) gives a command to the module loader 112 to load the execution region, and the module loader 112 gives a command to the file management unit 114 to load the execution region of the class (step S109).

When the execution region of the class file is in the folder 116 of the own node, the file management unit 114 upon receiving the command loads the execution region from that class file (steps S110 to 111). If the class file does not exist or there is no execution region in the folder 116 (class file of only the metadata), the execution region of the class file in another node is loaded (steps S110 to 112).

In this embodiment, the expanded first master module 121a (step1.class) exists in the folder 116 of the master node 10. Thus, the file management unit 114 loads the execution region and informs it to the module loader 112.

Figure 9:
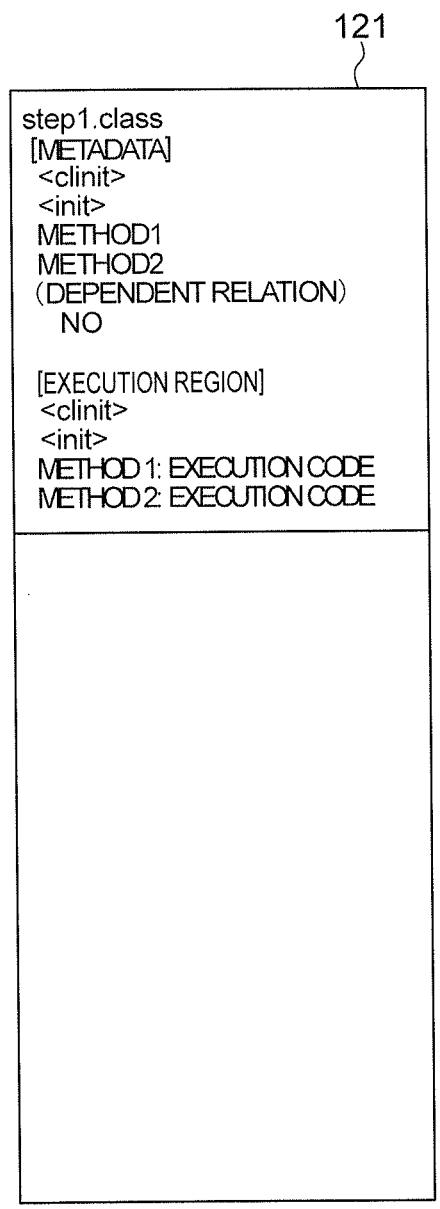
FIG. 9 is an explanatory chart showing the first master module (step1.class) that is in a state where the processing up to step S113 shown in FIG. 5 is completed and the execution region is rewritten.

The module loader 112 disposes the execution region to the main memory, rewrites the metadata, and performs re-initialization to be in a state where the method can be executed (step S113). FIG. 9 is an explanatory chart showing the first master module 121a (step1.class) in a state where the execution region is rewritten when the processing up to step S113 shown in FIG. 5 is completed. Then, the execution container 111 (master container) executes the first master module 121a (step1.class) in that state (step S114), and ends the processing regarding the first step 121.

Subsequently, the execution container 111 (master container) starts to execute the processing regarding the second step 122. That is, the processing same as that of steps S101 to 106 is executed for the second master module 121a (step2.class).

Subsequently, the module loader 112 performs the processing for solving the dependent relation from the metadata of the second master module 121a (step2.class) (step S107).

The section of "dependent relation" of the metadata of the second master module 121a (step2.class) indicates to be dependent on the slave module 122b (step2_slave.class) and the shared module 122c (shared2.class), so that those are tried to be read out from the metadata sharing unit 115. However, those do not exist therein, so that the file management unit 114 reads them out and writes them to the metadata sharing unit 115.

Figure 10:
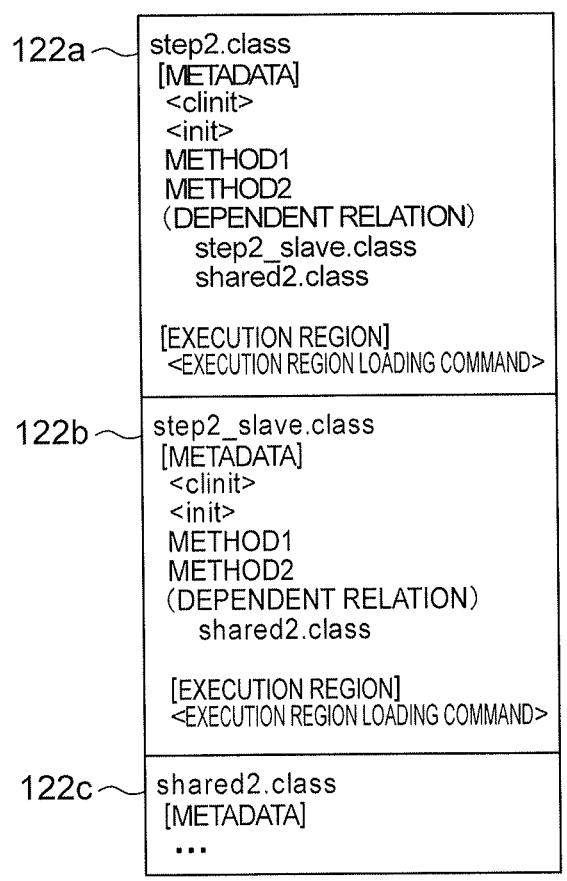
FIG. 10 is an explanatory chart showing a second master module (step2.class) in which "execution region loading command" is defined by distributed batch application shown in FIG. 4.

Thereby, the dependent relation is solved. Thus, the processing is shifted to step S108 to execute tentative initialization from a state where all the methods are replaced with "execution region loading command" as in the case of the first step 121 (steps S108 to 114). FIG. 10 is an explanatory chart showing the second master module 122a (step2_slave.class) whose "execution region loading command" is defined in the distributed batch application 120 shown in FIG. 4. In this case, the slave module 122b (step2_slave.class) and the shared module 122c (shared2.class) remain as they are on the master node 10 side.

Figure 11:
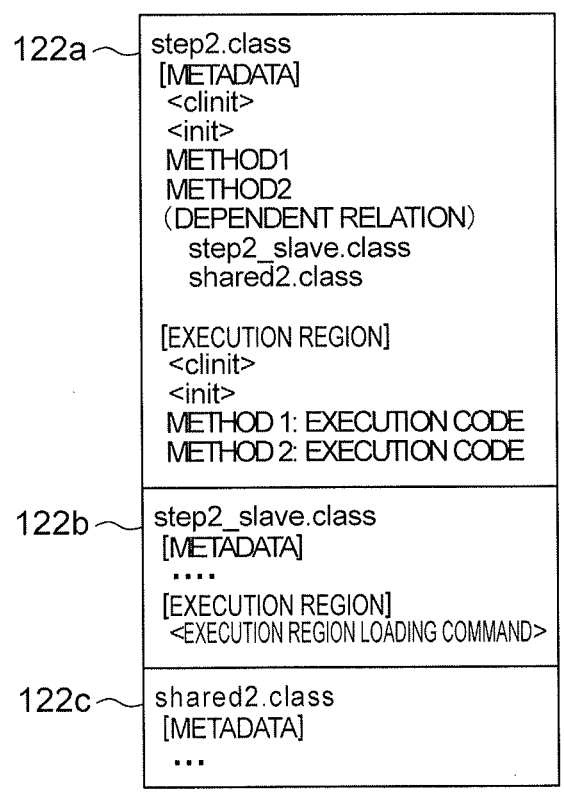
FIG. 11 is an explanatory chart showing a slave module (step2_slave.class) of only metadata that is created by the processing of step S115 shown in FIG. 5.

In the second step 122, the master node 10 and the slave nodes 20 execute distributed parallel processing in a cooperative manner. Thus, the execution container 111 (master container) of the master node 10 creates the slave module 122b (step2_slave.class) of only the metadata (execution region is only "execution region loading command") and sends it to the slave nodes 20 (step S115). FIG. 11 is an explanatory chart showing the slave module 122b (step2_slave.class) of only the metadata created by the processing of step S115 shown in FIG. 5. Note that the slave module 122b of only the metadata created by the master node 10 may or may not be saved in the storage module 12 of the master node 10 side.

The execution container (slave container) of the slave node 20 upon receiving it starts execution of the slave module 122b (step2_slave.class) and performs the same processing as that of steps S101 to 103. In the section of the "dependent relation" of the metadata of the slave module 122b (step2_slave.class) requires the shared module 122c (sgared2.class), so that the metadata management unit 113 checks whether or not the modules exist in the metadata sharing unit 115 of the master node 10 (steps S101 to 104).

The module loader 112 of the slave node 20 acquires metadata of the second master module 121a (step2.class) of the master node 10, the slave module 122b (step2_slave.class), and the shared module 122c (shared2.class) via the metadata management unit 113. Originally, it is necessary to perform the processing for solving the dependent relation. However, it is already being solved by the processing of the master node 10. Thus, those modules are acquired from the metadata sharing unit 115 of the master node (step S107), and "dependent relation is solved" thereby.

The module loader 112 of the slave node 20 expands the metadata acquired from the metadata sharing unit 115 of the master node 10 on the folder 116, and tentative initialization is performed as in the case of the master node 10 (step S108).

The execution container 111 (slave container) of the slave node 20 calls the slave module 122b (step2_slave.class). However, "execution region loading command" is contained in the metadata thereof, so that an instruction for loading the execution region is given to the module loader 112 of the slave node 20 (step S109).

The file management unit 114 of the slave node 20 upon receiving that command reads out the execution region of the class file from the folder 116 of the master node 10 and writes it to the own folder 116, since the slave module 122b (step2_slave.class) is not in the own folder 116 (steps S113, 116).

Figure 12:
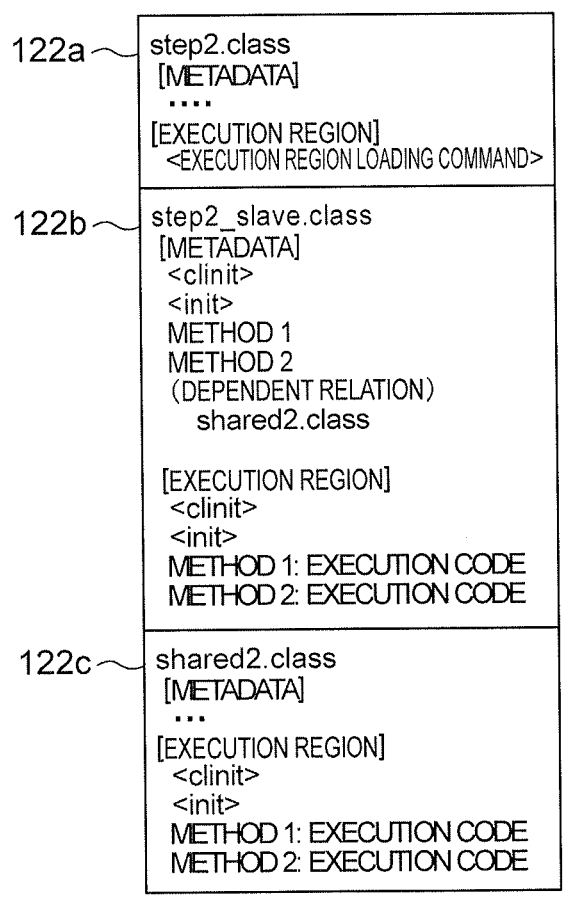
FIG. 12 is an explanatory chart showing a slave module (step2_slave.class) that is in a state where the processing shown in step S113 of FIG. 5 is completed and the execution regions are disposed.

The module loader 112 of the slave node 20 disposes the execution region to the main memory, rewrites the metadata, and performs re-initialization to be in a state where the method can be executed (step S113). FIG. 12 is an explanatory chart showing the slave module 122b (step2_slave.class) in a state where the execution region is disposed when the processing of step S113 shown in FIG. 5 is completed. Then, the execution container 111 (slave container) executes the slave module 122b (srep2_slave.class) in that state (step S114), and ends the processing regarding the second step 122.

The processing regarding the third step S123 is executed by the master node 10 alone as in the case of the first step 121. Through the above, the processing regarding execution of the distributed batch application 120 is completed.

(Overall Actions and Effects of First Embodiment)

Next, the overall actions of the above-described embodiment will be described.

The distributed processing method according to the embodiment is presented in the distributed processing system in which a plurality of computers are connected mutually and the distributed batch application is executed by those computers in a cooperative and distributed manner. The metadata management unit acquires the metadata containing the command of the initialization processing out of each of the modules constituting the distributed batch application (FIG. 5: steps S101 to 107). The module loader performs the initialization processing by the metadata (FIG. 5: step S108). After the initialization processing, the file management unit checks whether or not the execution region containing the execution code of the module exists in the storage module (FIG. 6: steps S109 to 110). When the execution region containing the execution code does not exist in the storage module, the file management unit loads the execution code from another computer and writes it as the execution region (FIG. 6: steps S110 to 112, 116), and the execution container executes the module containing the execution code (FIG. 6: steps S113 to 114).

Then, after the initialization processing, the file management unit creates the module of only the metadata as a file, and shares it with other computers by the metadata management unit (FIG. 5: step S115). Note here that: one of the plurality of computers is the master node which manages distributed execution of the distributed batch application, and the computers other than the master node are the slave nodes; and the processing is done by the file management unit of the master node which creates the module of only the metadata as a file after the initialization processing, and transmits it to the slave nodes.

Note here that each of the action steps may be put into a program to be executed by computers to have those executed by the processors 11 and 12 which are provided to each of the master node 10 and slave nodes 20 which directly execute each of the steps. The program may be recorded in a nontemporal recording medium such as a DVD, a CD, a flash memory, or the like. In that case, the program is read out from the recording medium and executed by the computers. With such actions, the embodiment can provide following effects.

In the embodiment, the master node 10 first transmits the module file of only the metadata to the slave node 20, so that the data amount transmitted at that point can be reduced thereby. Further, the execution code is acquired from the master node 10 when the execution processing is actually performed in the slave nodes 20. Thus, the execution code is not transmitted to the slave nodes that do not perform the processing actually, so that a great amount of transmission data can be reduced.

Further, the metadata used by the slave nodes in the distributed processing are the same in principle and only the processing target data and the like are different. Thus, the same metadata can be used in common among a great number of slave nodes, so that it is not necessary to perform the same initialization processing every time. Therefore, initialization can be performed at a higher speed. Further, there may be a case where the same processing for different data is allotted to the same slave node in the distributed processing. However, even in such case, it is also possible to acquire the effect of speeding up the initialization by sharing the same metadata.

As the expansion of the embodiment, first, the processing of steps S104 to 105 shown in FIG. 5 may be defined to have the metadata loaded to the metadata sharing unit 115 and the file management unit 114 at the same time and to use the metadata that is read out first. Thereby, an effect of speeding up the reading can be expected. Further, even if either one results in a reading error, reading from the other can be done. Thus, an effect of achieving a fault resistant characteristic can be expected.

Similarly, the metadata and the execution region may be read out at the same time. Further, the metadata may be read out from the own node and the execution region may be read out from another node.

In the meantime, it is defined as a rule that a fixed character string in a class file is necessarily contained in metadata in Java language. However, the fixed character string data is not used in tentative initialization. Thus, the metadata containing no fixed character string may be distributed to the slaves from the master, and the fixed characteristic string data may be acquired simultaneously with acquisition of the execution code of the execution region. Thereby, more reduction in the transmission data amount can be expected.

Further, in the processing of steps S104 to 108 shown in FIG. 5, the metadata is loaded from the master node 10 and the file of only the metadata is written to the local folder. However, it may also be written to the local metadata sharing unit 115 at the same time. For example, in a case where an execution error occurs in the slave node 20 and it is restarted, the metadata can be re-read from the metadata sharing unit 115 on the same node. Therefore, loading and re-initialization processing can be performed at a high speed.

Second Exemplary Embodiment

In addition to the structures shown in the first embodiment, a distributed processing system 200 according to a second exemplary embodiment of the present invention is designed to include a distributed shared memory 230 that can be shared in common from each of the computers and a metadata management unit 313 is designed to include a function which has the distributed shared memory 230 store a common file referred by the metadata.

With such structure, the same effect as those of the first embodiment can be acquired. In addition, it becomes possible to speed up the processing further by using the same metadata in different processing.

Hereinafter, this will be described in more details.

Figure 13:
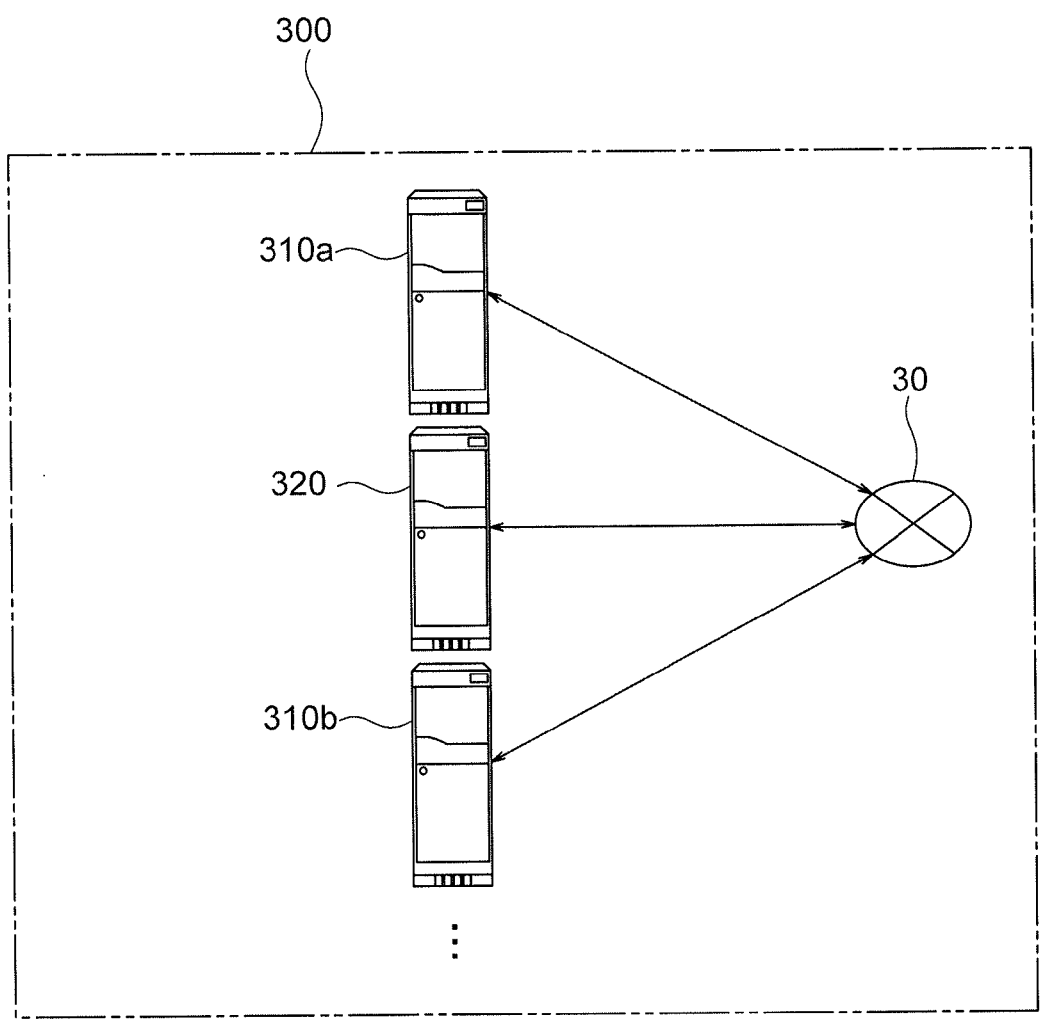
FIG. 13 is an explanatory chart showing the structures of a distributed processing system according to a second embodiment of the present invention.

FIG. 13 is an explanatory chart showing the distributed processing system 200 according to the second embodiment of the present invention. The distributed processing system 200 is structured by mutually connecting a plurality of computer devices as in the case of the above-described first embodiment. However, shown herein is a case where different processing controlled by a plurality of master nodes is executed in parallel in the same distributed processing system.

Therefore, FIG. 13 only shows three nodes such as master nodes 210a, 210b (referred to as master nodes 210 as a general term) and a slave node 220. Further, the distributed shared memory 230 that can be accessed to refer to the content from any of the master nodes 210 and the slave node 220 is connected to each of the devices simultaneously. Needless to mention that there is no specific limit set in the number of the master nodes 210 and the slave node 220. Further, while the distributed shared memory 230 can actually be achieved by an external storage device or the like connected to a network such as NAS (Network Attached Storage), there is no specific limit set for the specific device mode.

Figure 14:
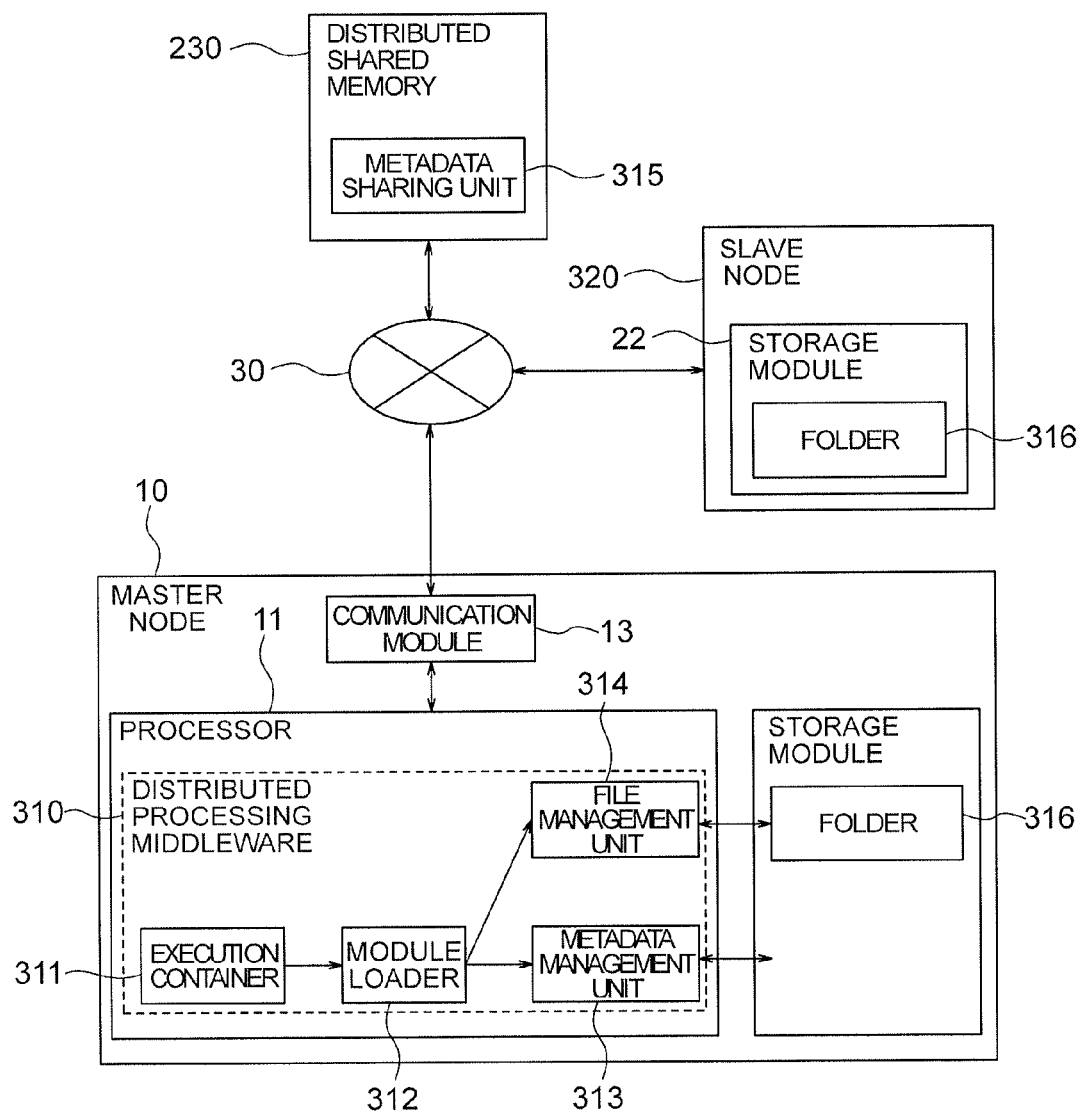
FIG. 14 is an explanatory chart showing more detailed structures of a master node and a slave node shown in FIG. 13.

FIG. 14 is an explanatory chart showing more detailed structures of the master nodes 210 and the slave nodes 220 shown in FIG. 13. Both the master node 210 and the slave node 220 have the same structures as the master node 10 and the slave node 20 of the first embodiment in terms of hardware. Thus, same names and same reference numerals are applied to same elements, and detailed explanations thereof are omitted specifically.

In the processor 11 (21), the OS 101 (operating system) first operates and, on condition of that, a distributed processing middleware 310 different from that of the first embodiment operates thereafter. The distributed processing middleware 310 includes each of functional units such as an execution container 311, a module loader 312, a metadata management unit 313, and a file management unit 314. Further, the above-described distributed shared memory 230 is functioned as a metadata sharing unit 315, and the storage module 12 (22) is functioned as a folder 316.

Actions of each of the functional units of the distributed processing middleware 310 are same as the actions of each of the functional units of the distributed processing middleware 110 of the first embodiment in principle. However, the metadata sharing unit 315 is on the distributed shared memory 230, so that the content thereof can be referred in common from each of the nodes which operate different distributed batch applications. On condition of the actions of the distributed processing middleware 310, the distributed batch applications 320 and 330 operate.

Figure 15:
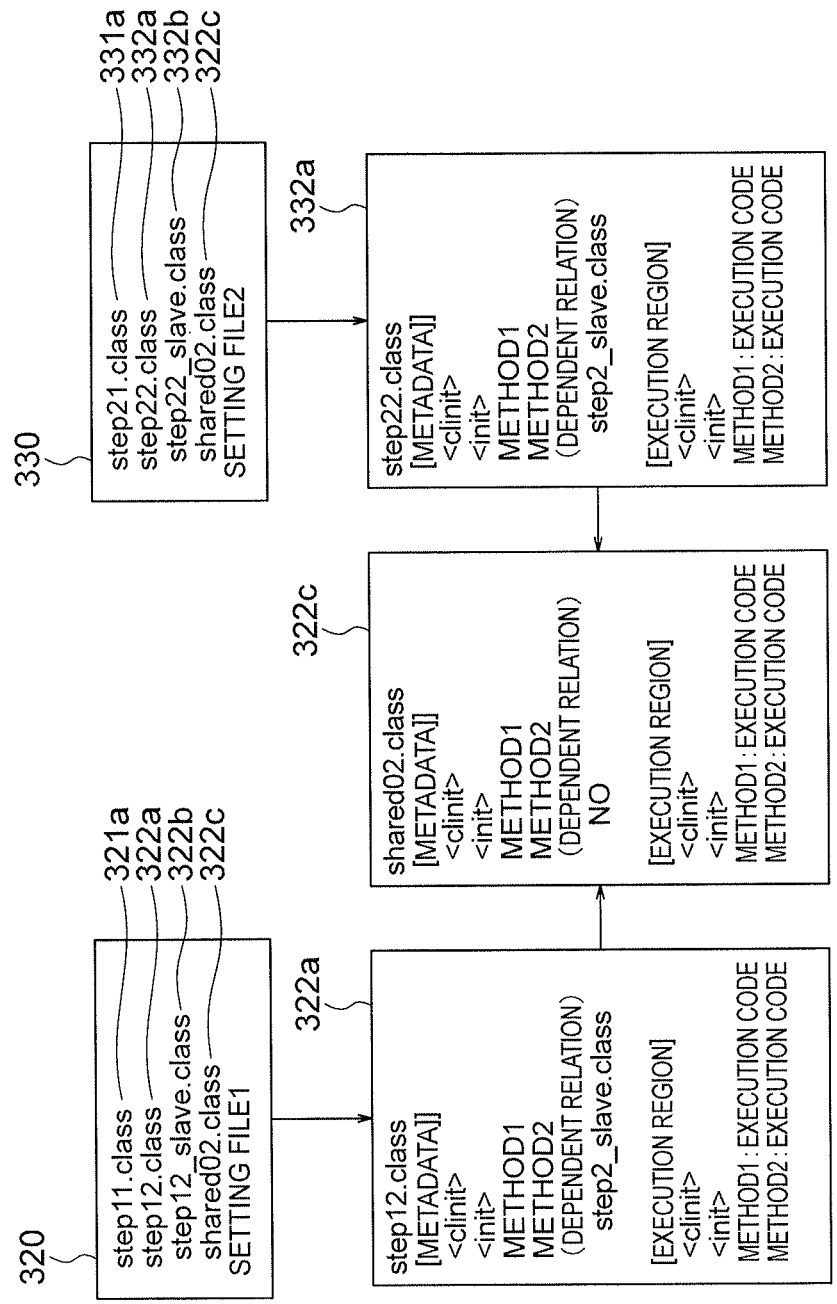
FIG. 15 is an explanatory chart showing the structure of distributed batch application that is operated in the distributed processing system shown in FIGS. 13 to 14.

FIG. 15 is an explanatory chart showing the structures of the distributed batch applications 320 and 330 which are operated in the distributed processing system 200 shown in FIGS. 13 to 14. The distributed batch application 320 is structured by action steps of first to third steps 321 to 323 as in the case of the distributed batch application 120 described in the first embodiment. Similarly, the distributed batch application 330 is also structured by action steps of first to third steps 331 to 333.

Note here that the module executed by the master node 210a in the first step 321 of the distributed batch application 320 is referred to as a first master module 321a (step11.class), the module executed by the master node 210a in the second step 322 is referred to as a second master module 322a (step12.class), and the module executed by the slave node 320 in the second step 322 is referred to as a slave module 322b (step12_slave.class). No specific explanation is necessary for those after the third step 323, so that depiction thereof is omitted herein.

Similarly, the module executed by the master node 210*b* in the first step 331 of the distributed batch application 330 is referred to as a first master module 331*a* (step21.class), the module executed by the master node 210*b* in the second step 332 is referred to as a second master module 332*a* (step22.class).

Further, the slave module 332*b* (step22_slave.class) executed by the slave node 320 in the second step 332 uses a shared module 322*c* (shared02.class) same as that of the distributed batch application 320. No specific explanation is necessary for the slave module 322*b* (step12_slave.class) and those after the third step 333, so that depiction thereof is omitted herein.

When operating the distributed batch applications 320 and 330 in the distributed processing system 200, the actions up to the first steps 321 and 331 are the same actions as those of the first embodiment. That is, when the master node 210*a* starts the distributed batch application 320, the metadata of the shared module 322*c* (shared02.class) is stored in the metadata sharing unit 315. Subsequently, when the master node 210*b* starts the distributed batch application 330, the shared module 322*c* (shared02.class) can be used in common since the metadata thereof is already being stored.

Figure 16:
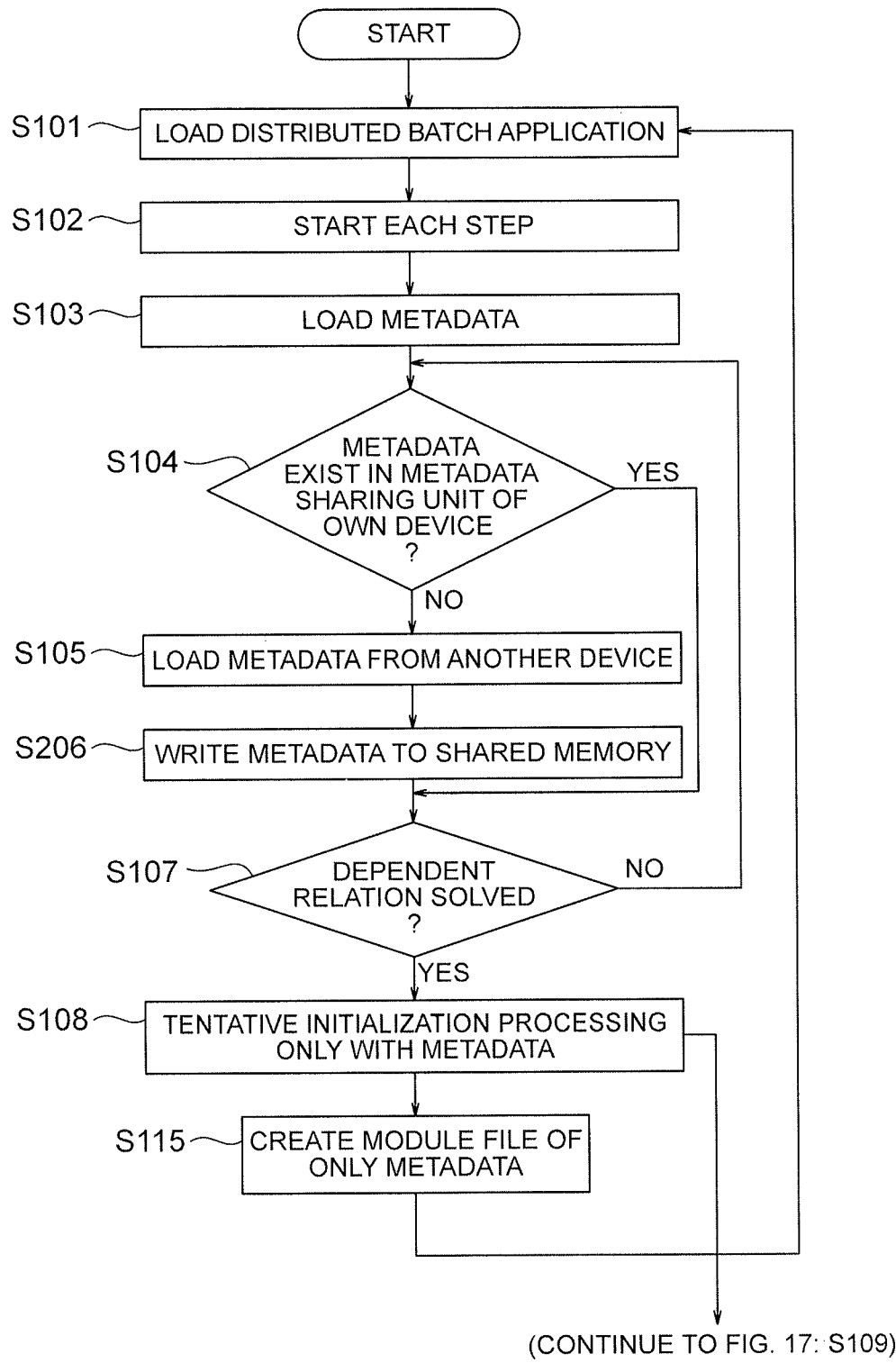
FIG. 16 is a flowchart showing the processing executed in a case where the distributed batch application shown in FIG. 15 is operated in the distributed processing system shown in FIGS. 13 to 14.
Figure 17:
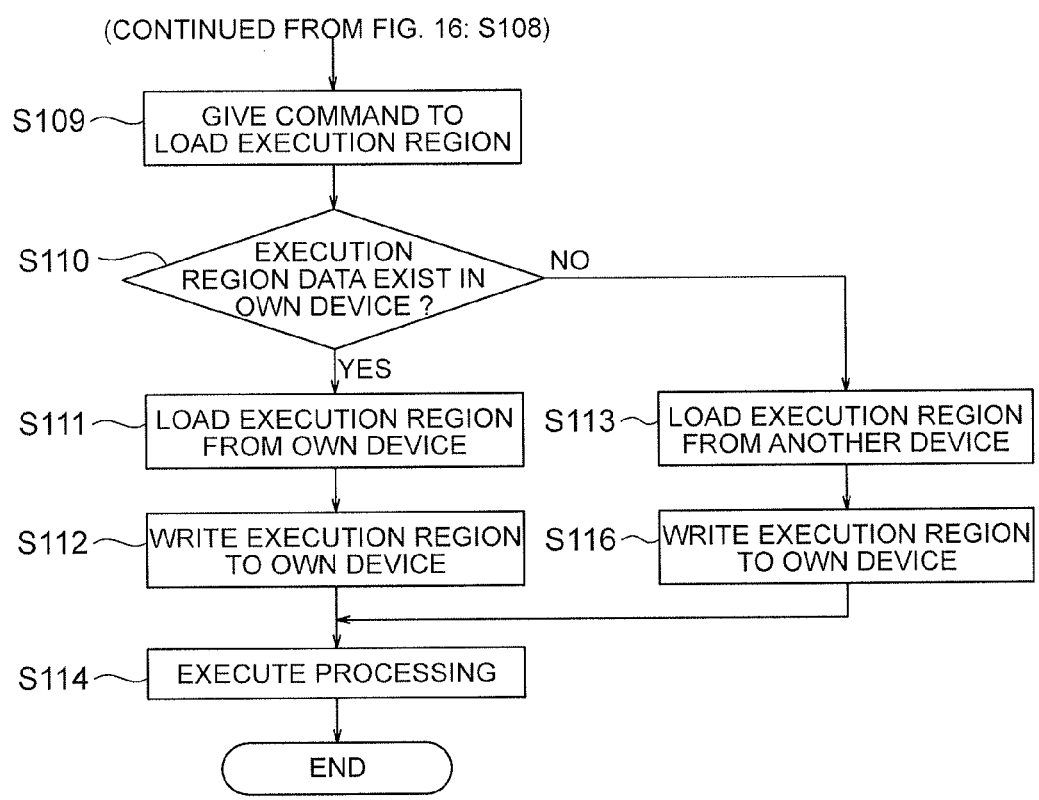
FIG. 17 is a flowchart continued from FIG. 16.

FIGS. 16 to 17 are flowcharts showing the processing when the distributed batch applications 320 and 330 shown in FIG. 15 are operated in the distributed processing system 200 shown in FIGS. 13 to 14. Those are shown in FIGS. 16 to 17 dividedly on two pages because of the spaces of the paper faces. Each of the actions shown in the flowcharts of FIGS. 16 to 17 is basically the same as those of the first embodiment shown in FIGS. 5 to 6, so that same reference numerals are applied to same actions. Only the difference is that the metadata sharing unit 315 to which the metadata is written is in the distributed shared memory 230 (step S206).

Figure 18:
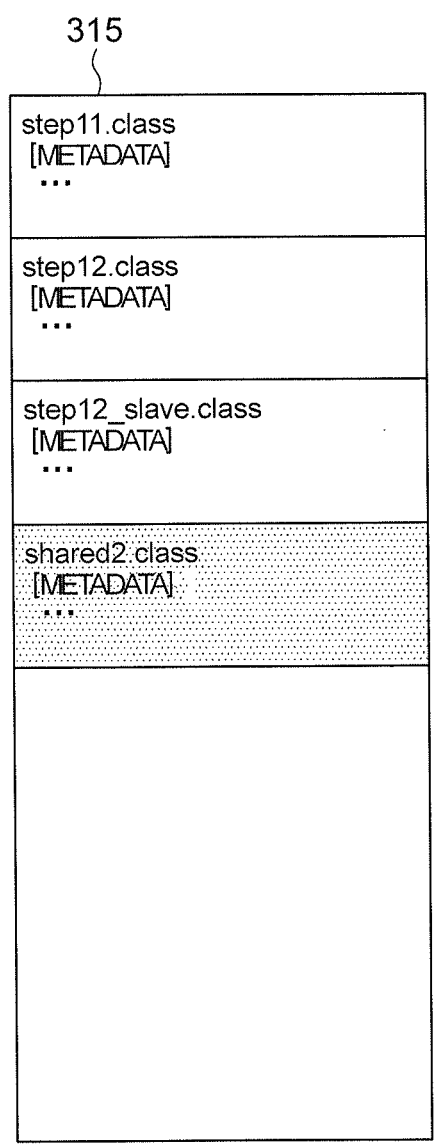
FIG. 18 is an explanatory chart showing a metadata sharing unit in a state where actions of a distributed batch application 320 are completed.
Figure 19:
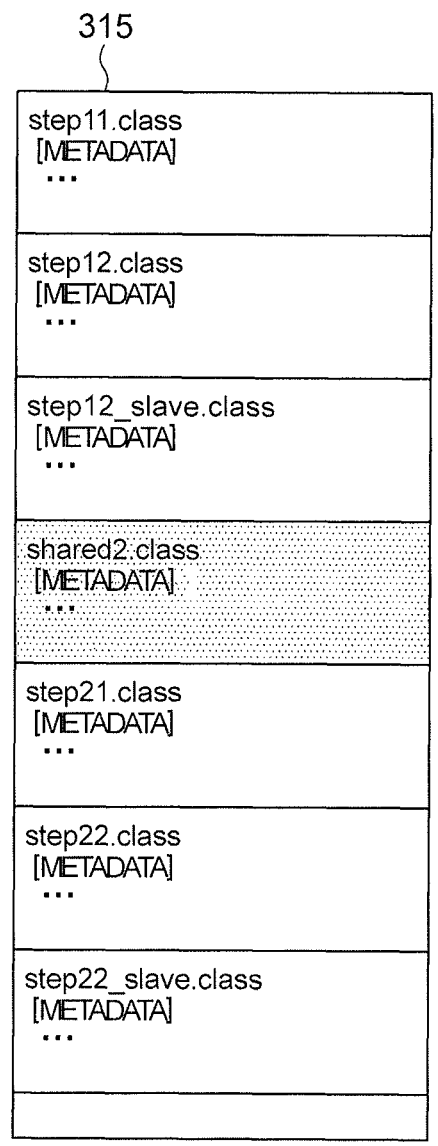
FIG. 19 is an explanatory chart showing the metadata sharing unit in a state where actions of a distributed batch application 330 are completed after the actions of the distributed batch application 320.
Figure 20:
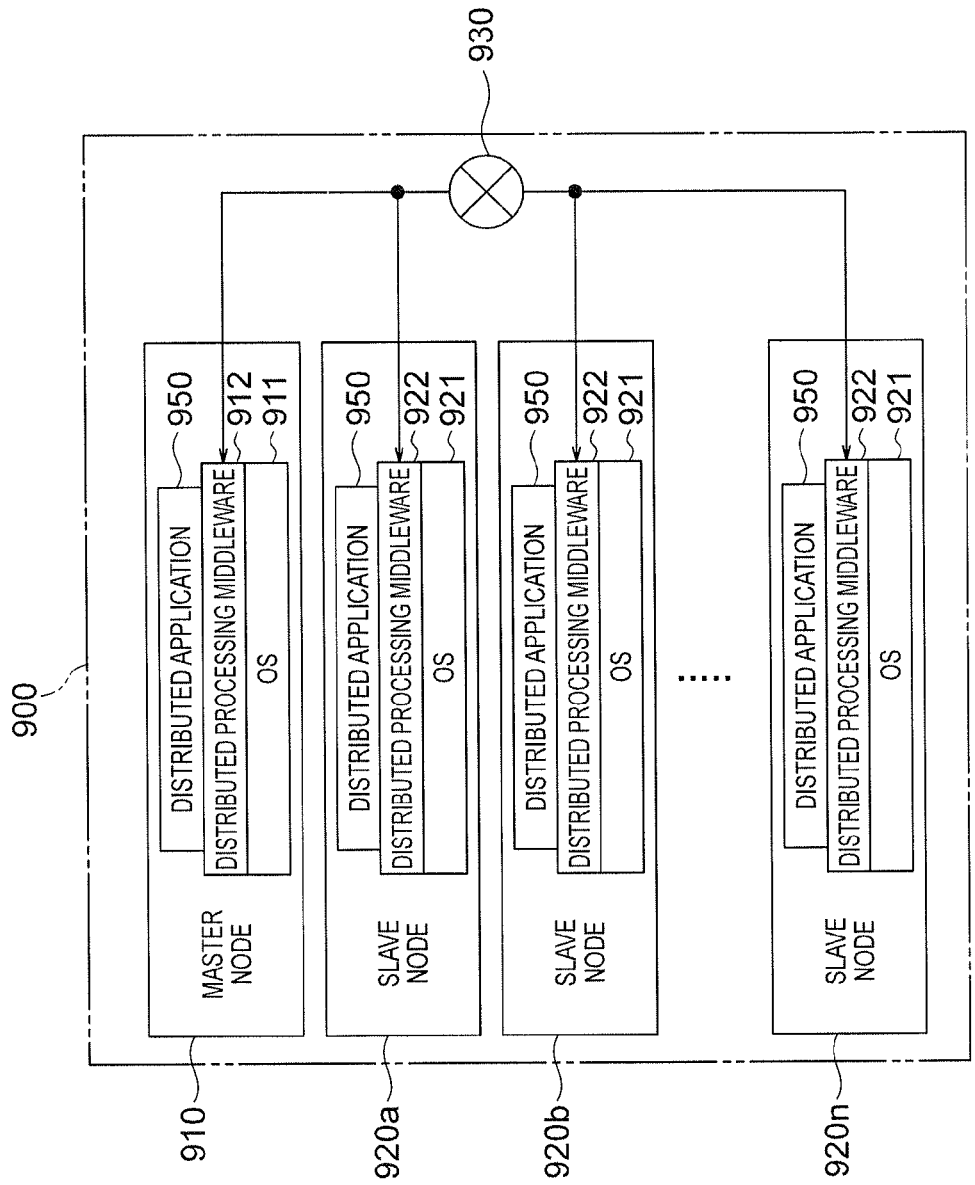
FIG. 20 is an explanatory chart showing the structures of an existing distributed processing system.
Figure 21:
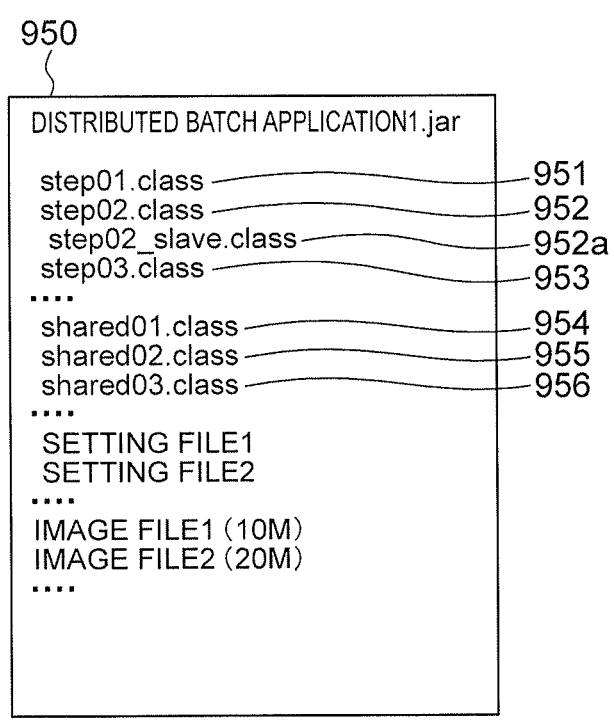
FIG. 21 is an explanatory chart showing the structure of distributed application that is executed by the distributed processing system shown in FIG. 20.
Figure 22:
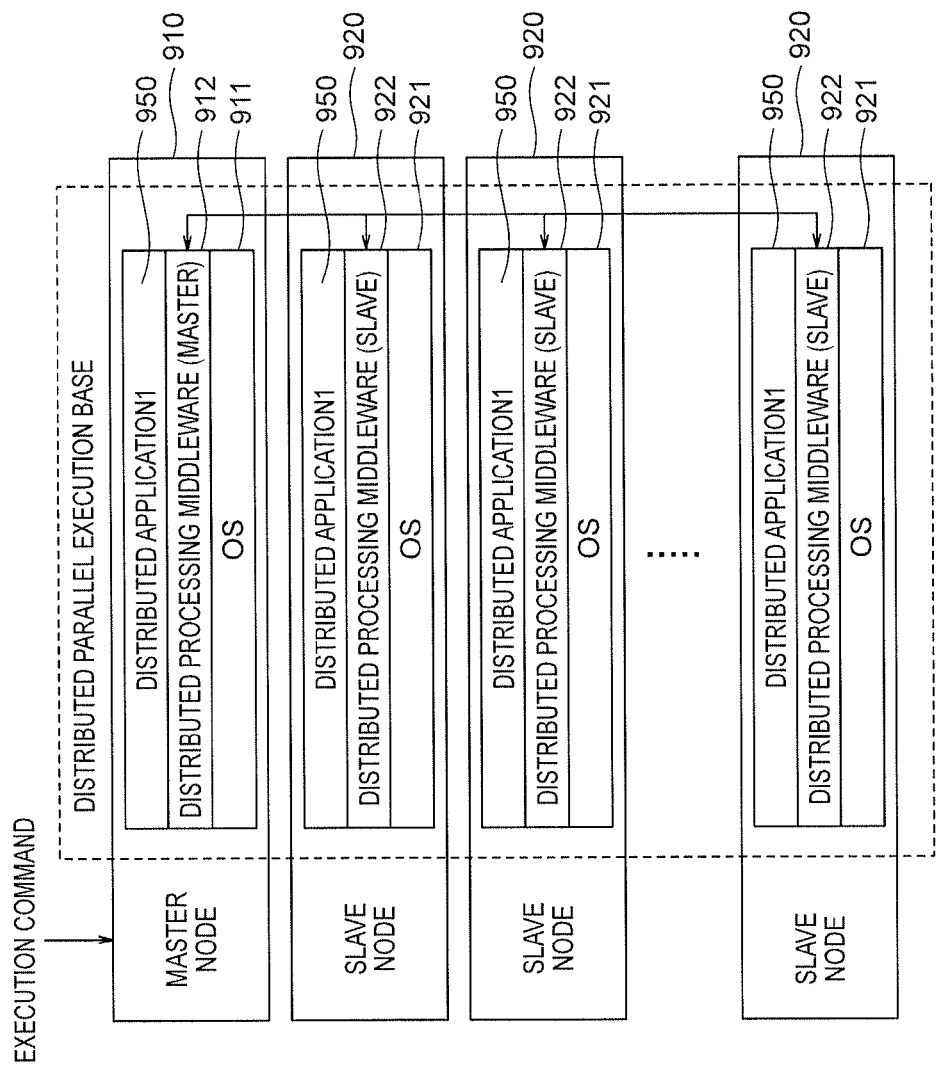
FIG. 22 is an explanatory chart showing actions when the distributed application shown in FIG. 21 is executed by the existing distributed processing system shown in FIG. 20.

FIG. 18 is an explanatory chart showing the metadata sharing unit 315 in a state where the actions of the distributed batch application 320 are completed. FIG. 19 is an explanatory chart showing the metadata sharing unit 315 in a state where the actions of the distributed batch application 330 are completed after the actions of the distributed batch application 320.

As shown in FIG. 18, in the metadata sharing unit 315 at this stage, the first master module 312*a* (staep11.class), the second master module 322*a* (step12.class), the slave module 322*b* (step12_slave.class), and the shared module 322*c* (shared02.class) constituting the distributed batch application 320 are stored (depiction of those after the third step is omitted).

When operating the distributed batch application 330 thereafter, the shared module 322*c* (shared02.class) at the stage shown in FIG. 18 can be used in common, while the first master module 331*a* (step21.class), the second master module 322*a* (step22.class), and the slave module 322*b* (step22_slave.class) constituting the distributed batch application 330 are stored in the metadata sharing unit 315. These actions can be done at a high speed since it is not necessary to make an inquiry to the other nodes regarding the existence of the module.

As described above, with the embodiment, it is possible to share the metadata by decreasing duplication thereof among a plurality of distributed batch applications which execute different jobs. Thus, deployment and initialization of applications can be made more efficient. Further, it becomes unnecessary to make inquiries to the other nodes regarding the existence of the metadata, so that it is unnecessary to find out which metadata is in which node. Therefore, even if there is a node having a fault being generated, no failure because of such node occurs in acquiring the metadata.

As an expansion of the embodiment, both the master node and the slave node may be structured to register the metadata read by the own container to the metadata sharing unit 115. For example, if there is metadata that is not read out by the master node but read out by the slave node, there is a possibility that the metadata is used by the master node and other slave nodes with other distributed batch applications.

While the present invention has been described above by referring to the specific embodiments shown in the drawings, the present invention is not limited only to the embodiments described above. Any other known structures can be employed, as long as the effects of the present invention can be achieved therewith.

The new technical contents of the above-described embodiments can be summarized as follows. While a part of or a whole part of the embodiments can be summarized as follows as the new techniques, the present invention is not necessarily limited only to the followings.

(Supplementary Note 1)

A distributed processing system which includes a plurality of mutually connected computers which execute a distributed batch application in a cooperative and distributed manner, wherein:

each of the computers includes a module loader which performs initialization processing by loading each module constituting the distributed batch application, a metadata management unit which acquires metadata containing a command of the initialization processing among each of the modules from a storage module provided in advance or from another computer, a file management unit which reads/writes a file in the storage module or in another computer, and an execution container which executes the distributed batch application; and the file management unit includes a function which checks whether or not an execution region containing an execution code of the module exists in the storage module after the module loader performs the initialization processing by the metadata and, when the execution region does not exist, loads the execution code from another computer and writes it as the execution region.

(Supplementary Note 2)

The distributed processing system as depicted in Supplementary Note 1, wherein the file management unit includes a function which creates the module of only the metadata as a file, and shares it with the other computers by the metadata management unit.

(Supplementary Note 3)

The distributed processing system as depicted in Supplementary Note 2, wherein:

one of the plurality of computers is a master node which manages distributed execution of the distributed batch application, and the computers other than the master node are slave nodes; and the file management unit of the master node includes a function which creates the module of only the metadata as a file and transmits it to the slave nodes.

(Supplementary Note 4)

The distributed processing system as depicted in Supplementary Note 1, which includes a distributed shared memory that can be referred from each of the computers in common, wherein the metadata management unit includes a function which stores a common file that is referred by the metadata to the distributed shared memory.

(Supplementary Note 5)

A distributed processing device, a plurality of which being connected mutually to constitute a distributed processing system which executes a distributed batch application in a cooperative and distributed manner, and the distributed processing device includes:

a module loader which performs initialization processing by loading each module constituting the distributed batch application;

a metadata management unit which acquires metadata containing a command of the initialization processing among each of the modules from a storage module provided in advance or from another computer;

a file management unit which reads/writes a file in the storage module or in another computer; and an execution container which executes the distributed batch application, wherein the file management unit includes a function which checks whether or not an execution region containing an execution code of the module exists in the storage module after the module loader performs the initialization processing by the metadata and, when the execution region does not exist, loads the execution code from another computer and writes it as the execution region.

(Supplementary Note 6)

The distributed processing device as depicted in Supplementary Note 5, wherein the file management unit includes a function which creates the module of only the metadata as a file, and shares it with the other computers by the metadata management unit.

(Supplementary Note 7)

The distributed processing device as depicted in Supplementary Note 5, wherein the metadata management unit includes a function which stores a common file that is referred by the metadata in a distributed shared memory that can be referred in common from each of the computers.

(Supplementary Note 8)

A distributed processing method used in a distributed processing system which includes a plurality of mutually connected computers which execute a distributed batch application in a cooperative and distributed manner, wherein:

a metadata management unit acquires metadata containing a command of initialization processing among each module which constitutes the distributed batch application;

a module loader performs the initialization processing by the metadata;

after the initialization processing, a file management unit checks whether or not an execution region containing an execution code of the module exists in a storage module;

when the execution region containing the execution code does not exist in the storage module, the file management unit loads the execution code from another computer and writes it as the execution region; and an execution container executes the module containing the execution code.

(Supplementary Note 9)

The distributed processing method as depicted in Supplementary Note 8, wherein after the initialization processing, the file management unit creates the module of only the metadata as a file, and shares it with the other computers by the metadata management unit.

(Supplementary Note 10)

The distributed processing method as depicted in Supplementary Note 9, wherein:

one of the plurality of computers is a master node which manages distributed execution of the distributed batch application, and the computers other than the master node are slave nodes; and after the initialization processing, the file management unit of the master node creates the module of only the metadata as a file and transmits it to the slave nodes.

(Supplementary Note 11)

The distributed processing method as depicted in Supplementary Note 8, which includes a distributed shared memory that can be referred from each of the computers in common, wherein the metadata management unit stores a common file that is referred by the metadata to the distributed shared memory.

(Supplementary Note 12)

A distributed processing program used in a distributed processing system which includes a plurality of mutually connected computers which execute a distributed batch application in a cooperative and distributed manner, and the program causes the computers to execute:

a procedure for acquiring metadata containing a command of initialization processing among each module which constitutes the distributed batch application;

a procedure for performing the initialization processing by the metadata;

a procedure for checking whether or not an execution region containing an execution code of the module exists in a storage module after the initialization processing;

a procedure for loading the execution code from another computer and writing it as the execution region when the execution region containing the execution code does not exist in the storage module; and a procedure for executing the module containing the execution code.

(Supplementary Note 13)

The distributed processing program as depicted in Supplementary Note 12, which causes the computers to further execute a procedure for creating the module of only the metadata as a file, and sharing it with the other computers after the initialization processing.

INDUSTRIAL APPLICABILITY

This application claims the Priority right based on Japanese Patent Application No. 2013-115527 filed on May 31, 2013 and the disclosure thereof is hereby incorporated by reference in its entirety.

The present invention can be applied broadly to a computer network which performs distributed processing. In particular, the present invention can provide an excellent effect in reducing the communication volume and speeding up the processing as the scale of distribution processing becomes larger.

REFERENCE NUMERALS 1, 100, 200 Distributed processing system
2, 2a, 2b Computer
3, 112 Module loader
4, 113 Metadata management unit
5, 114 File management unit
6, 111 Execution container
10, 210, 210a, 210b Master node
11, 21 Processor
12, 22 Storage module
13, 23 Communication module
20, 20a, 20b, 220 Slave node
30 Network
101 OS
110, 310 Distributed processing middleware
111, 311 Execution container
112, 312 Module loader
113, 313 Metadata management unit
114, 314 File management unit
115, 315 Metadata sharing unit
116, 316 Folder
120, 320, 330 Distributed batch application
120a Setting file
121, 321 First step
121a, 321a First master module
122, 322 Second step
122a, 322a Second master module
122b, 322b Slave module
122c, 322c Shared module
123, 323 Third step
123a, 323a Third master module
230 Distributed shared memory

The invention claimed is:

1. A distributed processing system, comprising
a plurality of mutually connected computers which execute a distributed batch application in a cooperative and distributed manner,
each of the plurality of computers comprises a processor configured to execute:
a module loader which performs initialization processing by loading each module constituting the distributed batch application, a metadata manager which acquires metadata containing a command of the initialization processing among each of the modules from a storage module provided in advance or from another computer, a file manager which reads and writes a file in the storage module or in the another computer, and an execution container which executes the distributed batch application; and
the file manager includes a function which checks whether or not an execution region containing an execution code of the module exists in the storage module after the module loader performs the initialization processing by the metadata and, when the execution region does not exist, loads the execution code from the another computer and writes the execution code as the execution region.

2. The distributed processing system as claimed in claim 1, wherein
the file manager includes a function which creates the module of only the metadata as a file, and shares the file with the plurality of computers by the metadata manager.

3. The distributed processing system as claimed in claim 2, wherein:
one of the plurality of computers is a master node which manages distributed execution of the distributed batch application, and the computers other than the master node are slave nodes; and
the file manager of the master node includes a function which creates the module of only the metadata as a file and transmits the file to the slave nodes.

4. The distributed processing system as claimed in claim 1, comprising a distributed shared memory that can be referred from each of the plurality of computers in common, wherein
the metadata manager includes a function which stores a common file that is referred by the metadata to the distributed shared memory.

5. A distributed processing device, in which a plurality of distributed processing devices being connected mutually to constitute a distributed processing system which executes a distributed batch application in a cooperative and distributed manner, the distributed processing device comprising a processor configured to execute:
a module loader which performs initialization processing by loading each module constituting the distributed batch application;
a metadata manager which acquires metadata containing a command of the initialization processing among each of the modules from a storage module provided in advance or from another distributed processing device;
a file manager which reads and writes a file in the storage module or in the another distributed processing device; and
an execution container which executes the distributed batch application, wherein
the file manager includes a function which checks whether or not an execution region containing an execution code of the module exists in the storage module after the module loader performs the initialization processing by the metadata and, when the execution region does not exist, loads the execution code from the another distributed processing device and writes the execution code as the execution region.

6. The distributed processing device as claimed in claim 5, wherein
the file manager includes a function which creates the module of only the metadata as a file, and shares the file with the plurality of distributed processing devices by the manager.

7. A distributed processing method comprising:
acquiring metadata containing a command of initialization processing among each module which constitutes a distributed batch application;
initializing the metadata;
after the initializing the metadata checking whether or not an execution region containing an execution code of the module exists in a storage module;
when the execution region containing the execution code does not exist in the storage module, loading the execution code from another computer and writing the execution code as the execution region; and
executing the module containing the execution code, wherein the distributed processing method is performed by a plurality of mutually connected computers which execute the distributed batch application in a cooperative and distributed manner and constitute a distributed processing system.

8. The distributed processing method as claimed in claim 7, further comprising:

after the initializing the metadata, creating the module of only the metadata as a file, and sharing the file with the plurality of computers.

9. The distributed processing method as claimed in claim 8, including one of the plurality of computers is a master node which manages distributed execution of the distributed batch application, and the computers other than the master node are slave nodes, further comprising:
after the initializing the metadata, creating, by the master node, the module of only the metadata as a file and transmits the file to the slave nodes.

10. A non-transitory computer readable recording medium storing a distributed processing program used in a distributed processing system which comprises a plurality of mutually connected computers which execute a distributed batch application in a cooperative and distributed manner, the program causing the plurality of computers to execute:
a procedure for acquiring metadata containing a command of initialization processing among each module which constitutes the distributed batch application;
a procedure for performing the initialization processing by the metadata;
a procedure for checking whether or not an execution region containing an execution code of the module exists in a storage module after the initialization processing;
a procedure for loading the execution code from another computer and writing it the execution code as the execution region when the execution region containing the execution code does not exist in the storage module; and
a procedure for executing the module containing the execution code.

11. A distributed processing system, comprising
a plurality of mutually connected computers which execute a distributed batch application in a cooperative and distributed manner,
each of the plurality of computers comprises module loading means for performing initialization processing by loading each module constituting the distributed batch application, metadata management means for acquiring metadata containing a command of the initialization processing among each of the modules from a storage module provided in advance or from another computer, file management means for reading and writing a file in the storage module or in the another computer, and execution container means for executing the distributed batch application; and
the file management means includes a function which checks whether or not an execution region containing an execution code of the module exists in the storage module after the module loading means performs the initialization processing by the metadata and, when the execution region does not exist, loads the execution code from the another computer and writes the execution code as the execution region.

12. A distributed processing device, in which a plurality of distributed processing devices being connected mutually to constitute a distributed processing system which each executes a distributed batch application in a cooperative and distributed manner, the plurality of distributed processing devices comprising:
module loading means for performing initialization processing by loading each module constituting the distributed batch application;
metadata management means for acquiring metadata containing a command of the initialization processing among each of the modules from a storage module provided in advance or from another distributed processing device;
the management means for reading and writing a file in the storage module or in the another distributed processing device; and
execution container means for executing the distributed batch application, wherein the file management means includes a function which checks whether or not an execution region containing an execution code of the module exists in the storage module after the module loading means performs the initialization processing by the metadata and, when the execution region does not exist, loads the execution code from the another distributed processing device and writes the execution code as the execution region.

\* \* \* \* \*